Dec. 18, 1962     J. J. FRANKLIN     3,068,987
CONVEYOR SYSTEM
Filed June 26, 1959     7 Sheets-Sheet 3
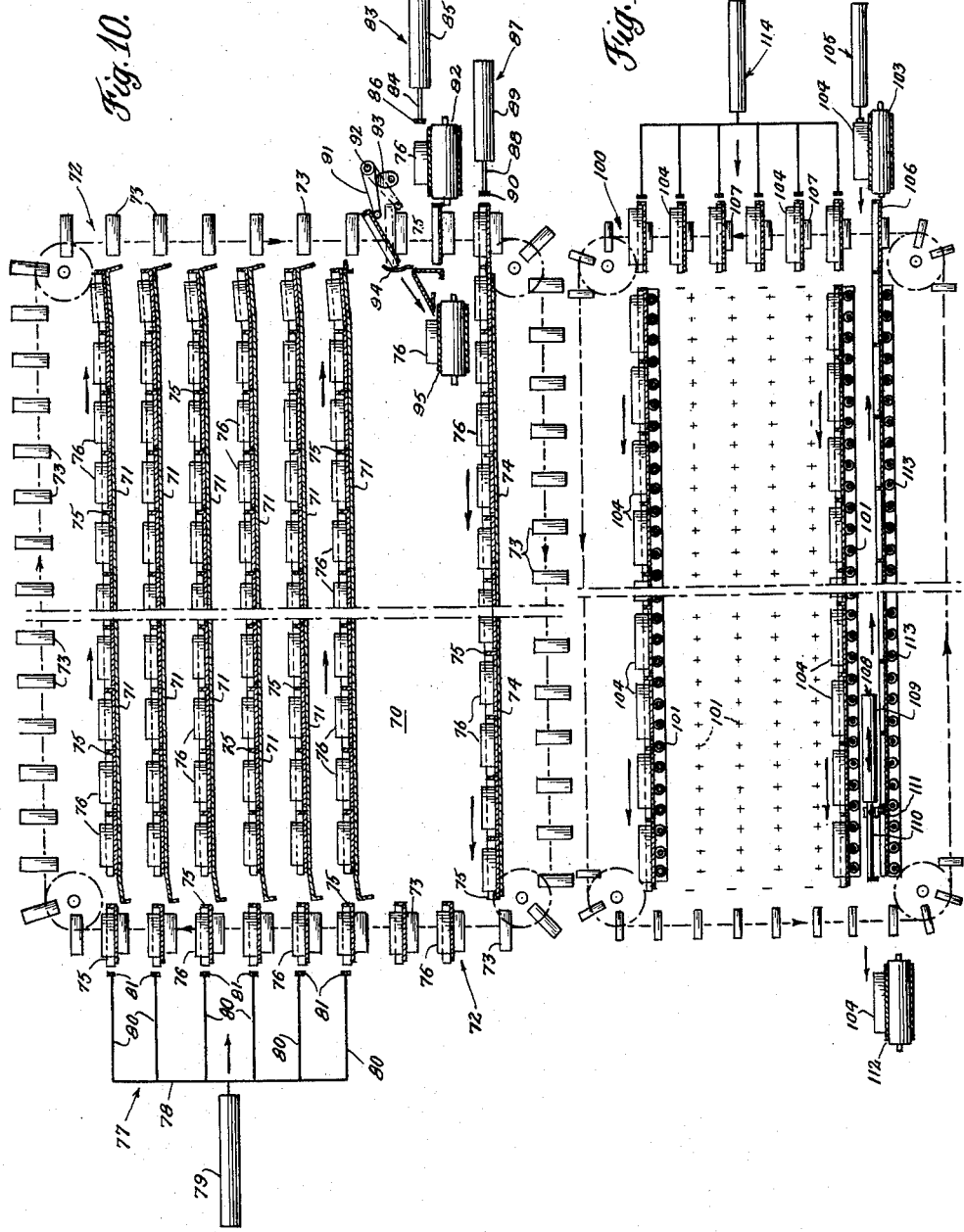
INVENTOR:
JOHN J. FRANKLIN
BY Howson & Howson
ATTYS.

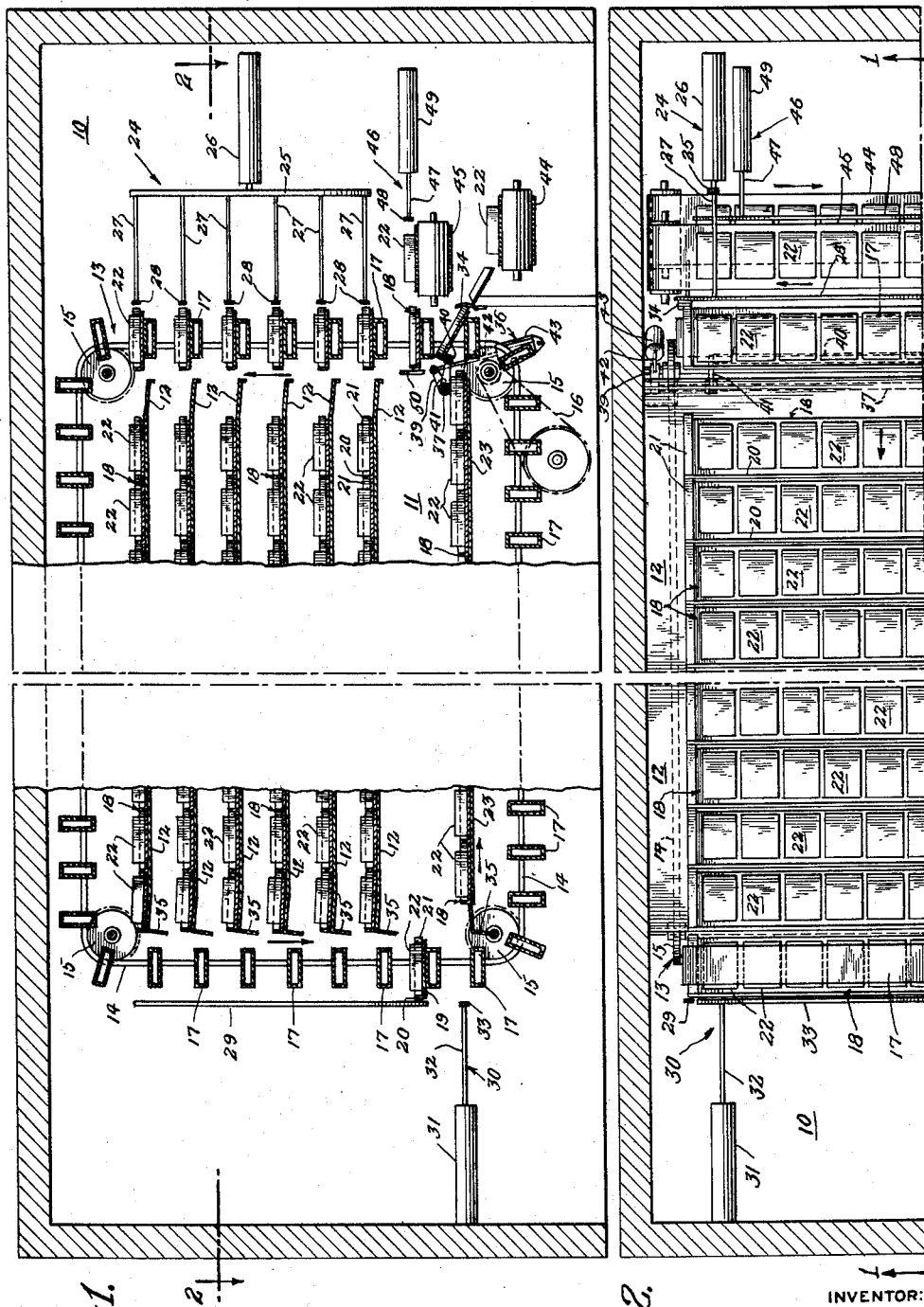

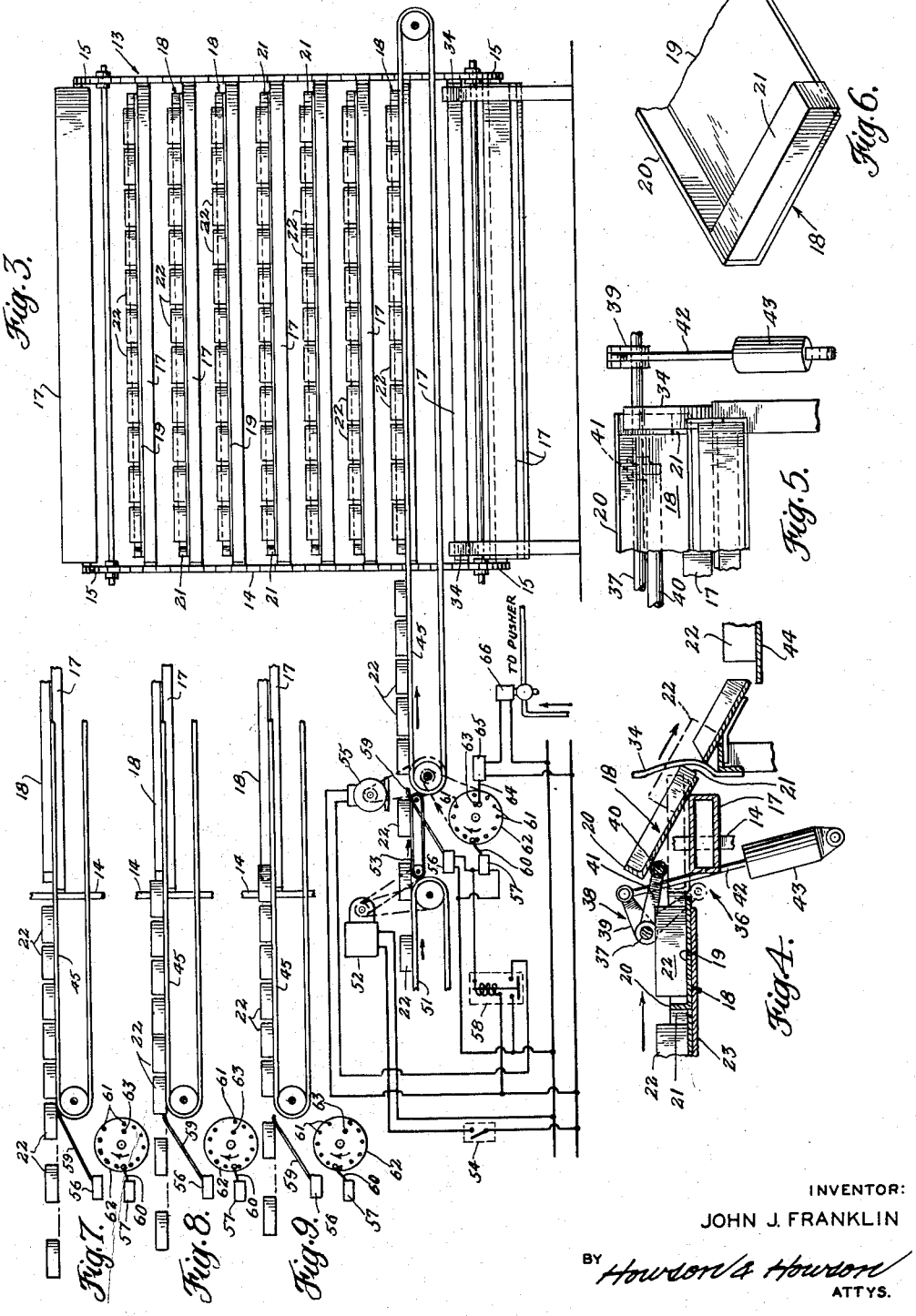

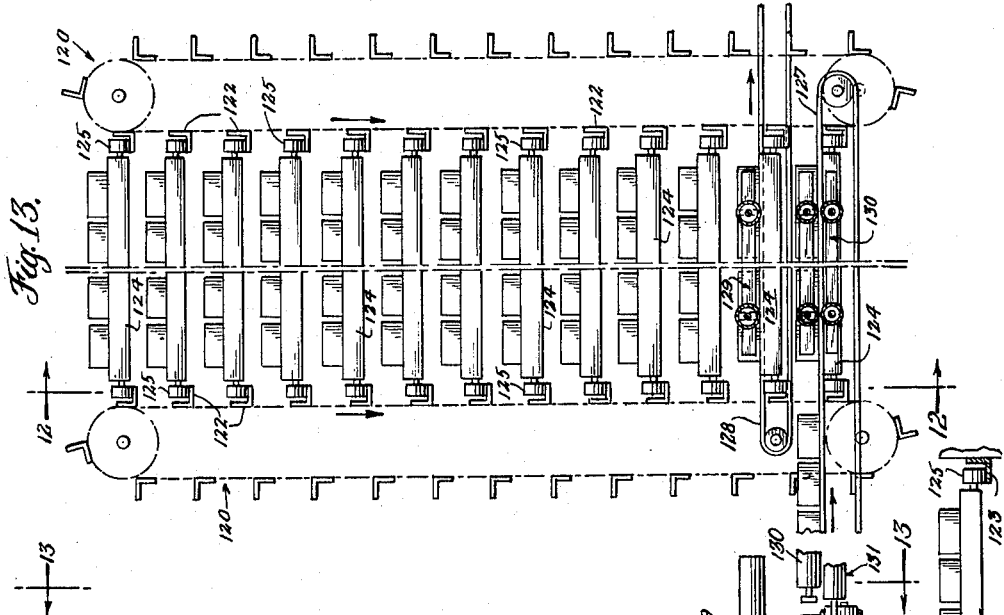
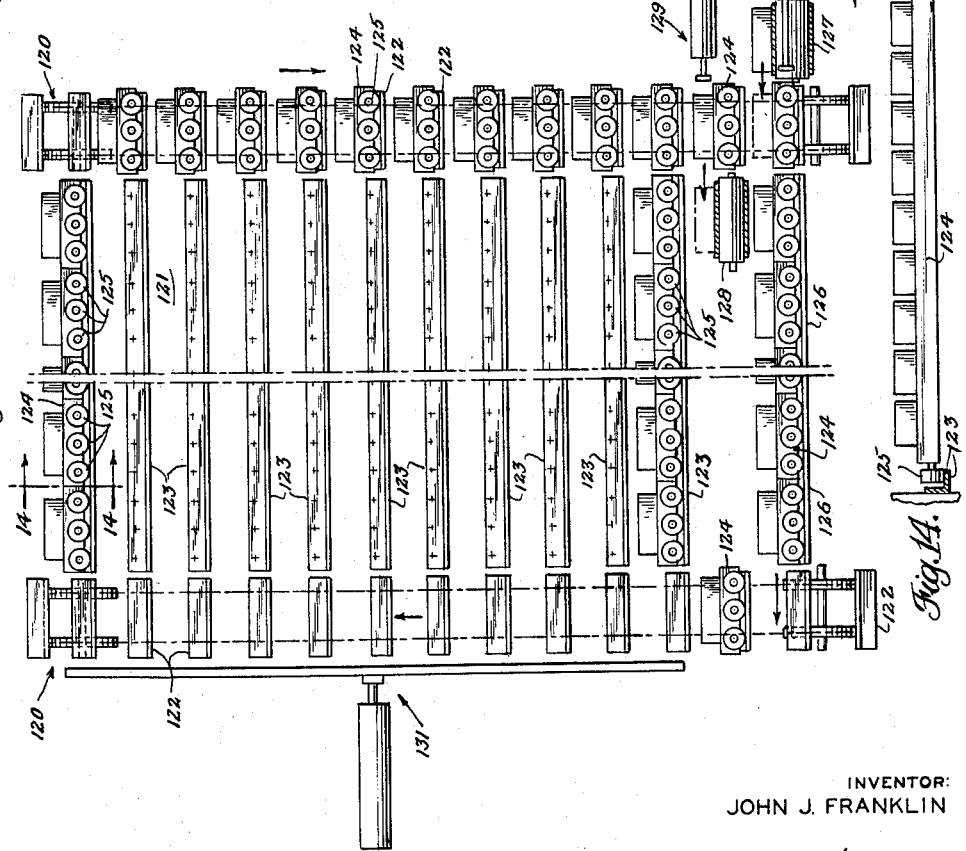

Dec. 18, 1962  J. J. FRANKLIN  3,068,987
CONVEYOR SYSTEM
Filed June 26, 1959  7 Sheets-Sheet 5

INVENTOR:
JOHN J. FRANKLIN
BY Howson & Howson
ATTYS.

Dec. 18, 1962   J. J. FRANKLIN   3,068,987
CONVEYOR SYSTEM
Filed June 26, 1959   7 Sheets-Sheet 6
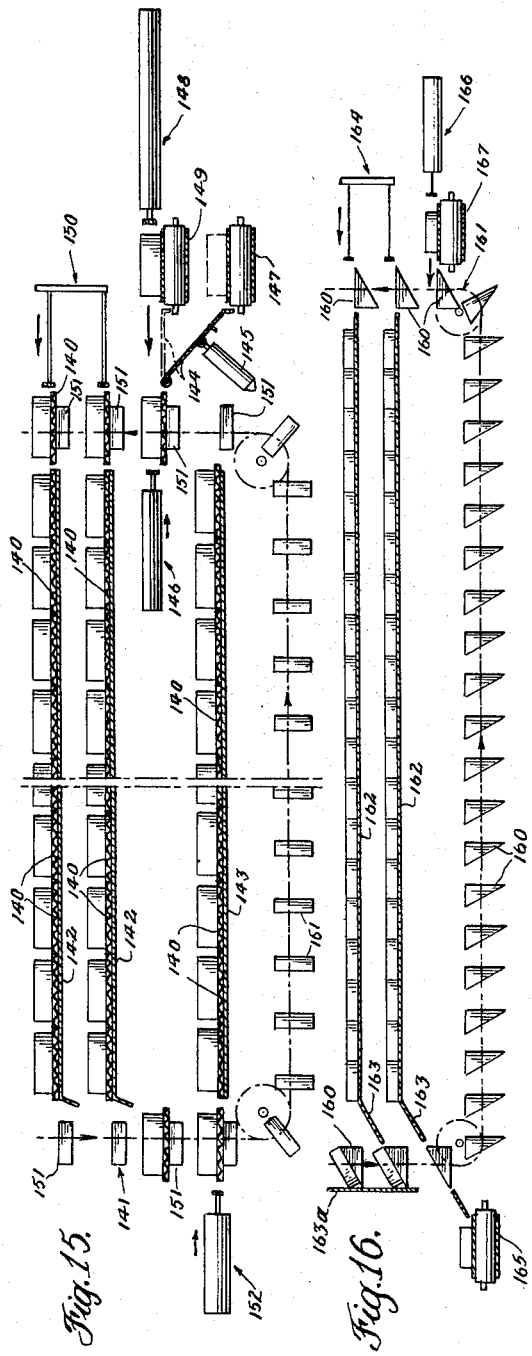
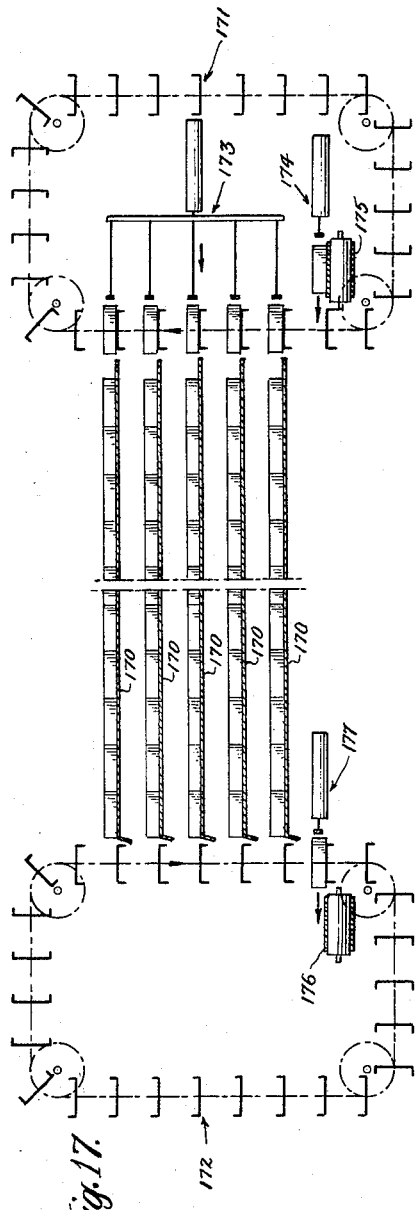
INVENTOR:
JOHN J. FRANKLIN
BY Howson & Howson
ATTYS.

Dec. 18, 1962
J. J. FRANKLIN
3,068,987
CONVEYOR SYSTEM
Filed June 26, 1959
7 Sheets-Sheet 7
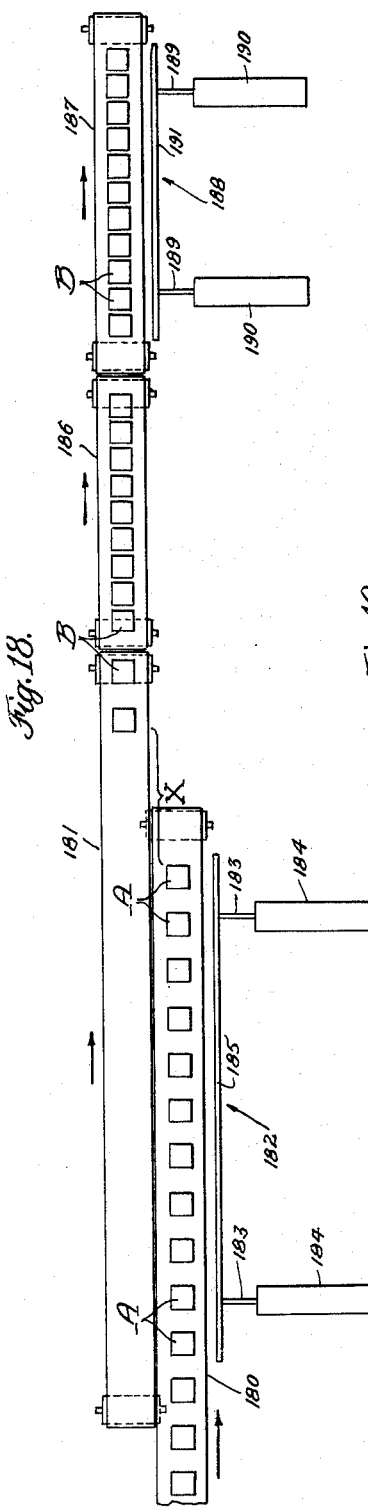
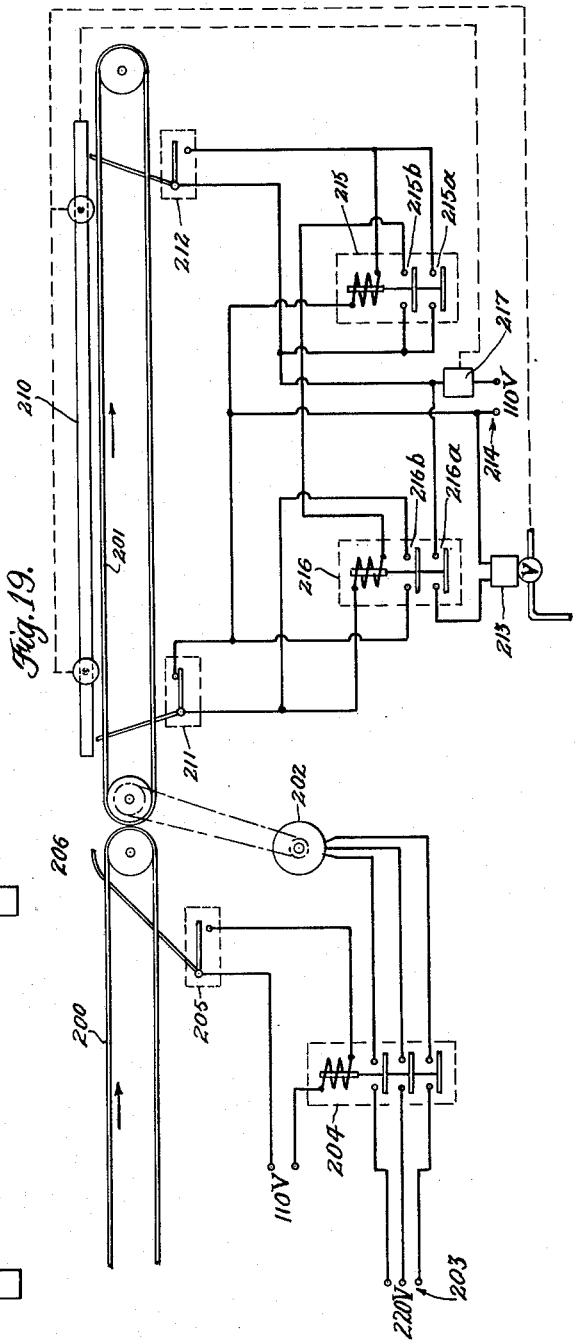
INVENTOR:
JOHN J. FRANKLIN
BY Howson & Howson
ATTYS.

United States Patent Office 3,068,987
Patented Dec. 18, 1962

3,068,987
CONVEYOR SYSTEM
John J. Franklin, Glenside, Pa., assignor, by mesne assignments, to Proctor & Schwartz, Inc., Philadelphia, Pa., a corporation of Pennsylvania
Filed June 26, 1959, Ser. No. 823,185
29 Claims. (Cl. 198—19)

The present invention relates to a conveyor system, and more particularly to a conveyor apparatus for continuously transporting a plurality of articles to a zone where they are subjected to a certain treatment, transporting the articles through the treating zone, and subsequently removing the articles from the area of the treating zone.

It is often desirable to subject a large number of articles to a treatment which may require the lapse of a given period of time to accomplish. For example, in the commercial production of bread, it has been the practice to subject the hot loaves of bread from the baking ovens to a cooling treatment prior to packaging in order to increase the rate of production. Heretofore, bread cooling has generally been accomplished batch-wise in a cooler having a plurality of vertically spaced trays for supporting the loaves of bread. The door to the cooler is opened and loaves of bread are arranged on each of the shelves by workmen. Thereafter the cooler door is closed and the loaves are permitted to remain in the cooler until they have reached the desired reduced temperature. The cooler door is reopened and the workmen remove the cooled loaves for packaging and reload the cooler.

Treatments involving apparatus of the above-described type have a number of disadvantages. Since the operation is carried out batch-wise, it is usually necessary to have several expensive pieces of apparatus of the same general type in order to obtain any reasonably rapid rate of production. This is the case because the apparatus ordinarily is shutdown during the loading and unloading thereof. Thus, in a given day there are substantial periods of time when the apparatus is not performing its desired function. Furthermore, manual loading and unloading are not only time consuming procedures, but involve substantial labor costs.

The present invention contemplates improved apparatus permitting continuous treatment of a plurality of articles at the same time. Thus, the apparatus of this invention avoids shutdowns as in batch operations, the operation of the apparatus being discontinued only for ordinary maintenance and cleaning. Furthermore, the present invention provides apparatus having improved mechanical controls which afford continuous automatic operation with a minimum of supervision.

The above and other objects of the present invention and the various features and details of the construction and operation thereof are fully set forth hereinafter with reference to the accompanying drawings wherein:

FIGURE 1 is a sectional elevational view of an article handling system constructed in accordance with the invention, the section being taken on the line 1—1 of FIGURE 2 and the view being partly broken out to condense the figure;

FIG. 2 is a one-half plan section taken on the line 2—2 of FIGURE 1;

FIG. 3 is a more or less diagrammatic end elevation looking toward the left in FIGURE 1 and including certain control mechanism;

FIG. 4 is an enlarged detailed section of an outfeed tray tilting mechanism;

FIG. 5 is a fragmentary elevation looking toward the left in FIGURE 4;

FIG. 6 is a fragmentary view of one of the article handling trays;

FIGS. 7, 8 and 9 are diagrammatic views illustrating different positions of article infeed;

FIG. 10 and FIG. 11 are elevational views of modified systems;

FIG. 12 is an elevational view of another modified system as taken on the line 12—12 of FIGURE 13;

FIG. 13 is a cross-section taken on the line 13—13 of FIGURE 12;

FIG. 14 is an enlarged detailed section of a tray and supporting means of the modified system of FIG. 12;

FIG. 15, FIG. 16 and FIG. 17 are diagrammatic elevational views of other modified systems.

FIG. 18 is a diagrammatic plan view of infeed conveyor means for properly spacing groups of articles for transfer to treating zone loading mechanism according to this invention.

FIG. 19 is a more or less diagrammatic side elevation of another form of infeed conveyor means for properly aligning packages for transfer to loading mechanism for the treating zone, including schematic wiring diagrams.

Figure 12A:
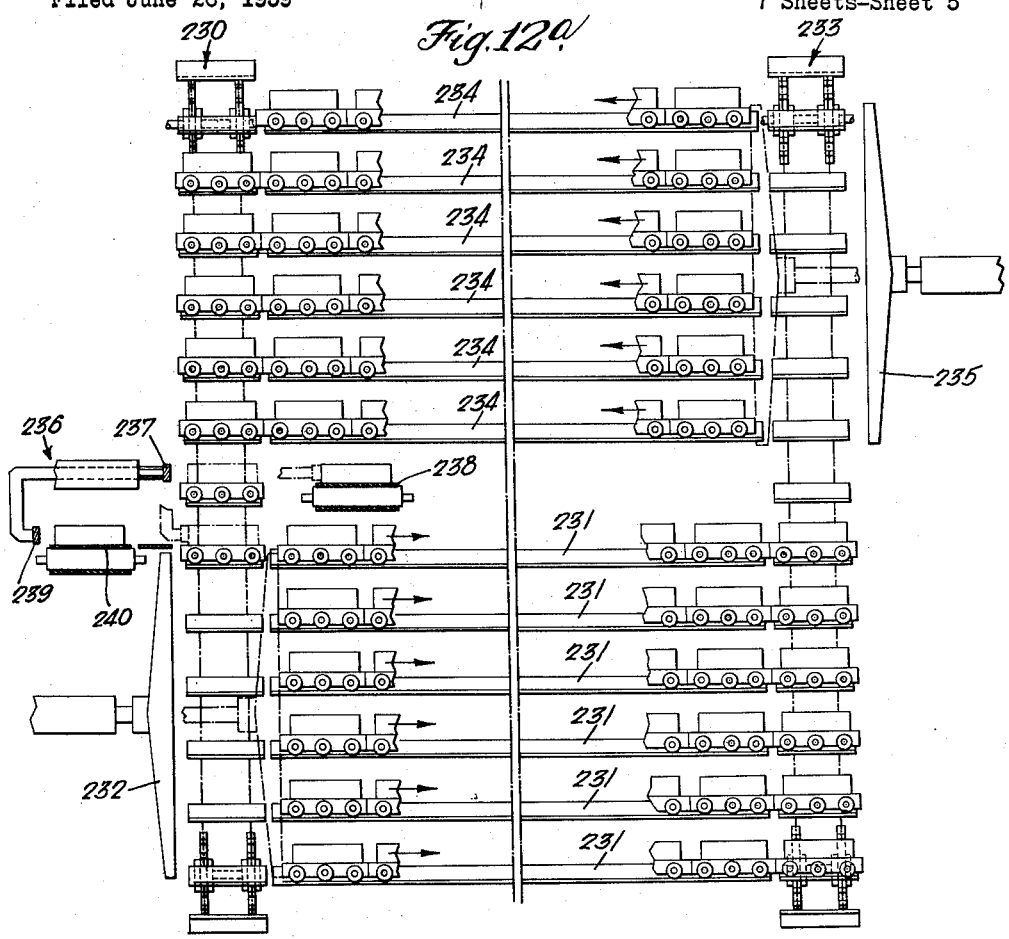
FIG. 12a is a schematic elevational view of a modified form of the apparatus of FIG. 12.

Referring to FIGURES 1, 2 and 3, apparatus of this invention is illustrated as being situated within an enclosure or room 10, which may be insulated if desired where the treatment to which the articles are to be subjected includes heating, cooling or the like. The treating zone 11 through which the articles pass comprises a plurality of generally horizontally extending, vertically spaced shelves or carrier plates 12 of any desirable width, but preferably of sufficient width to accommodate a plurality of articles aligned in side-by-side relation. For example, in FIGURE 3 the shelves 12 are shown as having a transverse dimension accommodating eleven articles 22 on a tray structure 18, more fully described hereinafter, for supporting the articles during their passage through the treating zone. In FIGS. 1 and 3, six shelves 12 are illustrated; however, the number of shelves may be increased or decreased, depending upon the desired rate of production of treated articles, available space, and like considerations. These shelves may be made of any material, ordinarily steel, having sufficient strength to support the we'ght of the articles and their carrying trays and which is not adversely affected by the type of treatment given the articles. Inasmuch as the trays for carrying the articles, and in other arrangements the articles themselves (see FIGS. 16 and 17), are in friction contact with the shelves, the shelves are preferably smooth-surfaced to minimize friction. The shelves 12 may be heated or cooled by suitable means, not shown, if the particular article treatment involves a thermal conditioning.

Extending completely about shelves 12 is a conveyor 13, which functions to present untreated articles at a plurality of levels in alignment with one end of shelves 12 for introduction to the shelves, and to receive treated articles from the shelves at a plurality of levels at the opposing ends of the shelves. Thus, the conveyor has a right hand up run and left hand down run at opposing ends of the shelves, the conveyor being operated in a counterclockwise direction. Conveyor 13 comprises right and left hand chains 14 which are driven at the same linear speed by four opposing sets of sprockets 15, one set of which is connected to a suitable drive mechanism, not shown, through the pulley and belt arrangement generally indicated at 16. Extending between chains 14 are a plurality of equally spaced, rigid cross bars 17 of generally rectangular cross section. As can be seen with reference to FIG. 3, the cross bars are approximately the same length as the width of the shelves 12 so as to enable them to support the same number of articles (and also a tray) as may be accommodated in the transverse direction by the shelves. These cross bars are so connected to chains 14 as to present flat tray-supporting surfaces on the up and down runs of the conveyor. The distance between the flat tray-supporting surfaces of adjacent cross bars is substantially equivalent to the distance between the load carrying surfaces of adjacent shelves 12. Thus, the cross bars can be brought into register with the shelves in the up and down runs so that the tray-supporting surfaces of the cross bars function as an extension of the shelves at each end of the latter.

Within the treating zone 11 and beneath the shelves or carrier plates 12 is a shelf 23 which is so located that each end thereof is confronted by the up and down runs of conveyor 13, and a cross bar in each run is in registry therewith when the cross bars in the runs are also in registry with shelves 12. Thus, a cross bar in each of the up and down runs of the conveyor in substance forms a continuation of each end of shelf 23.

Situated on shelves 12 and 23 are transversely extending rows of articles 22 supported on trays 18. Referring to FIG. 6 wherein one end of the trays is illustrated, the other end being a duplicate of that shown, trays 18 comprise a flat bottom portion 19 for supporting the articles, an upwardly extending flange 20 along one longitudinal edge of the tray to prevent articles introduced to the trays in the manner hereinafter described from overhanging the supporting base and thereby interfering with movement of the conveyor 13, and stiffening end bars 21. End bars 21 act as thrust members when a plurality of trays are placed in abutting relation on shelves 12 and 23, as illustrated in FIGS. 1 and 2, and act as tray abutment and positioning means in the tray dumping operation described subsequently.

As can be seen by reference to FIGS. 1 and 2, each of shelves 12, and also shelf 23, has a complete complement of trays 18 in abutting relationship, each of the trays supporting a plurality of articles 22. In addition, each of the cross bars 17 in the up run of the conveyor is in registry with a shelf 12 and contains a tray loaded with articles. The cross bars on the down run of the conveyor, however, are empty, with the exception of the cross bar next to the bottom one.

To the right of the up run of conveyor 13 is a loading ram or main multiple pusher 24 comprising a framework 25 mounted for translational motion. A pair of pressure cylinders 26 is associated with the framework to actuate the framework forwardly when a loaded tray is on each of the cross bars 17 is registry with a shelf 12. Forming part of framework 25 and disposed at each shelf level are outwardly projecting pairs of arms 27 having mounted between them an elongated abutment 28 for engaging the tray stiffening end bars 21. The abutments 28 are in vertical alignment so that when the loading ram 24 is advanced by the cylinders 26, the loaded trays at all levels are displaced onto the shelves 12. In addition, this action of the main multiple pusher pushes all of the trays along the carrier plates 12 one step equal in amplitude to the width of a single tray, and in so doing the leading left hand tray of each full complement of trays on shelves 12 is displaced onto a cross bar 17 of the down run of conveyor 13.

To the left of the down run of conveyor 13 is a pair of spaced apart vertically extending abutments 29 which engage the tray end thrust bars 21 in order to properly align the trays on the cross bars 17. In addition, each of shelves 12 is provided with a downwardly extending flange 35 along the left hand end edge thereof, which flange makes an obtuse angle with the shelf. These flanges also aid in aligning the shelves on the cross bars on the down run of the conveyor and keep the trays on the cross bars sufficiently spaced from the ends of the tray supporting surfaces of shelves 12, that should the leading tray on any shelf extend over the end edge of a shelf, it will not come into contact with the trays on the moving conveyor.

After the leading tray in each complement of trays on carrier plates 12 has been displaced onto the aligned cross bars of the down run of the conveyor in the manner described above, the conveyor 13 is advanced counterclockwise, step by step intermittently, each step being equivalent in amplitude to the distance between the tray supporting-surfaces of adjacent carrier plates 12. During the lull in the intermittent motion of conveyor 13, each loaded tray 18 supported by a cross bar 17 of the down run of the conveyor 13, when it reaches the bottom position of the down run, is displaced onto return carrier plate 23 by means of an unloading pusher 30 comprising a pair of cylinders 31, outwardly projecting pairs of arms 32 having mounted between them an elongated abutment 33 for engaging the tray stiffening end bars 21. This unloading pusher displaces a tray 18 loaded with treated articles onto return carrier plate 23, and at the same time the first loaded tray of the full complement of trays on carrier plate 23 is displaced onto the lowermost cross bar of the up run of conveyor 13.

Referring more particularly to FIGS. 4 and 5, a tray containing treated articles when displaced onto the lowermost cross bar of the up run of conveyor 13 is aligned for dumping by means of a pair of arcuate abutments 34 which engage end thrust bars 21 of trays 18.

Located adjacent the lowermost cross bar of the up run of conveyor 13 is a tray tilting mechanism 36, which is illustrated in greater detail in FIGS. 4 and 5. This tray tilting mechanism comprises a shaft 37 mounted for rotation having a lever arm 39 fixedly attached toward each end thereof exterior of the carrier plate 23 and chain 14 of conveyor 13. Only one of the arms is shown in the drawings. The shaft 37 also has longer arms 41 fixedly attached thereto which are connected by a rigid bar 40. This bar engages the bottom side of a tray along one edge thereof. The arms 39 and 41 of the shaft 37 in effect constitute a bell crank 38. A pair of rams 42, operated by a pair of cylinders 43 are connected to shorter arms 39 of the bell cranks to rotate them. In FIGS. 1, 4 and 5, the cylinder 43 has been actuated, thereby rotating the bell crank and causing the bar 40 to engage the rear edge of tray 18 and tilt the tray upwardly so that the tray pivots about the edge of the cross bar. The dotted lines show the position of the tilting mechanism in the rest position. As can be seen, the cross bar 40 drops into the space between the end of shelf 23 and a cross bar 17 of conveyor 13, and thus does not interfere with displacement of a tray 18 from shelf 23 onto the cross bar 17. The arcuate abutments 34 enhance this tilting movement due to their configuration and prevent the tray from being displaced from the cross bar. The treated articles readily slide from the tilted tray onto an outfeed or discharge conveyor belt 44 which carries the treated articles to the desired delivery point where they may undergo further processing, packaging, etc. Arcuate abutments 34 also serve to properly align trays 18 on cross bars 17 after the article dumping operation and during the subsequent movement of conveyor 13.

The tray tilting mechanism operates during the lull in the intermittent motion of the conveyor 13, cylinder 43 being actuated by a limit switch for energizing a solenoid valve (not shown) when the switch is tripped by a loaded tray displaced from carrier plate 23 onto the bottom cross bar of the up run of conveyor 13.

Untreated articles are delivered to the infeed end of the apparatus described above by means of a line conveyor infeed belt 45. This belt operates in such a manner, hereinafter described, as to deliver a full complement of untreated articles into position for displacement onto a tray on a cross bar of the up run of conveyor 13. When a full complement of such articles on conveyor 45 is aligned between the ends of a tray on a cross bar, and the cross bar is in registry with the infeed belt, i.e. when their respective surfaces lie in substantially a common plane, the articles are displaced from the infeed belt during a lull in the intermittent motion of both the infeed belt 45 and conveyor 13, by means of an infeed pusher 46 comprising a pair of rams 47 having extending therebetween an elongated bar 48 for engaging the articles on the infeed belt. Reciprocation of the infeed pusher is caused by means of a pair of cylinders 49. Infeed pusher 46 may be designed to cause pusher bar 48 to elevate a given distance above infeed belt 45 during retraction to permit belt 45 to deliver additional articles without hindrance during operation of the pusher. Mechanical linkage to effect such motion of the pusher bar are well known to those skilled in the art and thus not illustrated in the drawings. A pair of abutments 50 (FIG. 1) is provided to the left of the conveyor in the up run and opposite the infeed pusher to maintain each tray in proper position on its supporting cross bar when being loaded with articles by means of infeed pusher 46.

The operation of the apparatus illustrated in FIGS. 1–3, with the exception of the manner in which the infeed conveyor belt 45 is loaded with a full complement of untreated articles is as follows. Each of cross bars 17 of the up run portion of conveyor 13 is illustrated as supporting of tray 18 containing a full complement of untreated articles. At this stage of the operation, which is during a lull in the intermittent motion of conveyor 13, pressure cylinders 26 of the main multiple pusher 24 are actuated and the elongated abutments 28 engage trays 18 and displace them onto the carrier plates 12, whereby these trays engage the last tray in each full complement of trays on each carrier plate and the entire complement of trays is advanced the width of a single tray. In so doing the leading tray in each full complement of trays on shelves 12 is displaced onto a cross bar 17 of the down run of conveyor 13.

At the time the multiple pusher is actuated, the infeed pusher 46 and unloading pusher 30 may also be actuated, or they may be actuated in a given sequence, but during the same lull in an intermittent motion of conveyor 13. The infeed pusher displaces a full complement of untreated articles from infeed conveyor 45 onto an empty tray 18 supported on a cross bar 17 in the up run portion of conveyor 13, and the unloading pusher displaces a tray containing a full complement of treated articles from a cross bar in the bottom-most position of the down run of the conveyor onto the return carrier plate 23. This tray engages the last tray in the full complement of trays on carrier plate 23, whereby the entire complement of trays is advanced a distance equal to the width of one tray, and the leading tray of the complement is displaced onto the cross bar in the bottom-most position of the up run of the conveyor 13. The articles are then displaced from this tray by tray tilting mechanism 36.

In FIG. 1 the operation of the apparatus is at that point prior to actuation of main multiple pusher 24 and infeed pusher 46. Unloading pusher 30 has just been actuated to displace a tray onto the cross bar in the bottom-most position of the up run portion of conveyor 13, which tray is being tilted by means of the tilting mechanism 36, described in greater detail above.

The conveyor 13 is then advanced one step, the drive mechanism for conveyor 13 being actuated by means, not shown, responsive to completion of the cycle of operation of the various pushers. For example, infeed pusher 46 may trip a switch, not shown, to advance the conveyor one step. During the subsequent lull in the intermittent motion of the conveyor 13 a full tray load of untreated articles is again displaced onto a tray on the up run portion of the conveyor and a tray loaded with treated articles is displaced from the cross bar in the bottom-most position of the down run of the conveyor and onto return carrier plate 23, thereby displacing the leading loaded tray of the full complement of trays on carrier plate 23 onto the cross bar in the bottom-most position of the up run of the conveyor, all in the manner heretofore described. The platter tray is then tilted and the treated articles slide from the tilted tray onto the discharge conveyor 44.

The operation of the apparatus described in the paragraph immediately preceding is repeated several times until there is a tray containing a full complement of untreated articles on a cross bar in registry with each of the carrier plates 12, whereafter the entire operation described above is repeated.

Referring more particularly to FIGS. 3, 7, 8 and 9, there is there illustrated in diagrammatic form the manner in which a full complement of untreated articles is properly positioned on infeed conveyor belt 45 for displacement onto a tray on the up run portion of conveyor 13.

A line conveyor belt 51 delivers randomly spaced packages from processing, packaging or other equipment, not shown. Connecting line conveyor belt 51 and infeed conveyor belt 45 is a gap conveyor belt 53, having pulleys whose diameters are substantially less than the diameter of the pulleys of line conveyor belt 51 and infeed conveyor belt 45. As can be seen, if conveyors 45 and 51 were placed in end abutting relationship, there would be a large gap between the conveyors due to the size of the pulleys of these conveyors. Thus, gap conveyor belt 53, because of its small pulleys, acts to fill such gap so that articles may pass smoothly from one conveyor belt to the other.

Line conveyor belt 51 and gap conveyor belt 53 are driven at the same linear speed through suitable belt and pulley arrangements by an electric motor 52, which is connected to an electrical power source through switch 54. However, belts 51 and 53 may operate at different speeds. Infeed conveyor 45 is driven through a suitable belt and pulley arrangement by an electric motor 55, the electric current to which is controlled through switches 56 and 57.

Switches 56 and 57 are in parallel, and when either is in the closed position it actuates a solenoid operated switch 58, which completes the circuit to operate motor 55. Switch 56 is normally open and is provided with a hinged arm 59, the outer end of which extends above gap conveyor 53 and infeed conveyor 45 at a position approximately between these two conveyors. Thus, when an article is advanced by gap conveyor belt 53 toward infeed conveyor 45, the article comes in contact with arm 59 thereby closing switch 56 and completing the circuit to solenoid operated switch 58. The latter switch is thus closed and the circuit to electric motor 55 is completed whereby infeed conveyor 45 is set in motion.

Switch 57 is normally closed and is provided with an arm 60 which engages timing pins 61 of timing wheel 62, which pins open switch 57 when they contact arm 60. Timing wheel 62 is driven in a clockwise direction by infeed conveyor belt 45 through suitable belts and pulleys. Pins 61 of timing wheel 62 are all equally spaced with the exception of two pins which are spaced a greater distance apart than the rest of the pins. In FIGS. 3 and 7–9, the timing wheel 62 is shown as having eleven pins, the distance between each pin and adjacent pins being equal with the exception of two pins. These latter two pins are spaced further apart from each other than they are from the other respectively adjacent pins. In other words, the pins 61 define ten gaps of equal size, and an eleventh of greater size.

Timing wheel 62 is also provided with a pin 63 which engages arm 64 of switch 65, which is normally open. Contact between pin 63 and arm 64 closes switch 65, thereby completing the circuit to a solenoid valve 66 which operates infeed pusher 46.

It will be observed that the number of pins 61 on timing wheel 62 is equal to the number of articles which may be accommodated by trays 18. The timing device is thus designed to provide for proper alignment and spacing of a full tray complement of eleven untreated articles on infeed belt conveyor 45 and to space each complement of articles from the next by means of the greater gap between two of the pins 61 so that the infeed pusher 46 may displace a complete complement of articles from infeed conveyor 45 to a tray on a cross bar of the up run of conveyor 13. The above description of the alignment of articles on the infeed conveyor belt 45 will be more clearly understood from the following discussion of the operation of the timing wheel and associated switches.

In FIG. 3, switch 56 is shown as being open with an article 22 just approaching arm 59 thereof on gap conveyor 53. At this time switch 57, which is normally closed, is opened by a timing pin 61 of timing wheel 62 engaging arm 60 thereof. Eleven articles are shown as having been delivered into position on infeed conveyor 45 ready to be pushed onto a tray 18 on a cross bar of the up run of conveyor 13 by the infeed pusher 46. An additional five articles is aligned on conveyor 45 between infeed pusher 46 and gap conveyor 53. Conveyor 45 could be lengthened or shortened so that it will hold more than or less than five articles in addition to the eleven articles in position to be displaced from belt 45 by the infeed pusher 46. This may be accomplished by changing the position of pin 63 with respect to the larger gap between pins 61. For example, in FIGS. 3, 7, 8 and 9, switch 57 is opened five times by pins 61 after the larger gap between the pins has passed and before switch 65 is actuated by pin 63. If switch 57 were opened a greater or lesser number than five by contact of arm 60 with a greater or lesser number of pins 61 than five before arm 64 of switch 65 contacted pin 63 conveyor 45 would hold such greater or lesser number of articles in addition to the eleven articles in position to be contacted by infeed pusher 46.

Pin 63 on timing wheel 62 is shown in engagement with arm 64 of switch 65, which is normally open, thereby completing the circuit to actuate the solenoid valve 66 which operates the infeed pusher 46.

After the complete complement of articles has been placed on a tray by infeed pusher 46, the next article delivered by line conveyor 51 and gap conveyor belt 53 comes in contact with arm 59 thereby closing switch 56 completing the circuit to actuate solenoid switch 58. When the solenoid switch 58 is closed infeed conveyor motor 55 is started and this causes timing wheel 62 to rotate clockwise so that the pin 61 disengages arm 60 of switch 57 thereby closing switch 57. It can be seen at this time both of switches 56 and 57 are closed and motor 55 is operating to drive infeed conveyor 45. As the incoming article is moved along by infeed conveyor 45 it is moved out of contact with arm 59 of switch 56 so that this switch opens. However, at this time the next timing pin 61 on timing wheel 62 has not yet reached arm 60 of switch 57 and, therefore, closed switch 57, through solenoid operated switch 58 still supplies current to motor 55 and the infeed conveyor still continues to travel, in this connection see FIG. 8.

When the next pin 61 engages contact arm 60 of switch 57 and opens this switch, the motor 55 stops, the articles having been advanced one full step. By this time the small gap conveyor has advanced the next article toward hinged arm 59 of switch 56, see FIG. 9. This cycle is repeated ten times with even spacing of the articles due to the equal spacing of pin 61 on timing wheel 62. On the eleventh time, however, the gap between pin 61 is larger and, therefore, the infeed conveyor advances for a longer period, thus giving a spacing between articles large enough to enable the infeed pusher to operate without interfering with the next article being advanced. When the eleventh pin has stopped the infeed conveyor by opening switch 57, arm 64 of switch 65 engages a single pin 63 on the timing wheel 62, thereby actuating the infeed pusher by means of solenoid valve 66.

Counting means, or the like, (not shown) may be associated with infeed pusher 46 so as to cause operation of multiple loading ram 24 simultaneously therewith when a tray containing a full complement of articles is on each of the cross bars of conveyor 13 which is in registry with a shelf 12. Also, a solenoid valve of outfeed pusher 30 may be connected to switch 65 so as to operate simultaneously with infeed pusher 46.

Although timing wheel 62 has been illustrated as having eleven pins for spacing the articles on infeed conveyor 45, obviously this number may be increased or decreased depending on the number of articles the trays will accommodate. Also, instead of operating infeed pusher 46 by means of a pin 63 mounted on timing wheel 62, this pusher may be actuated by a limit switch which would be contacted by the leading article of a full tray complement of articles on infeed conveyor 45 when the complement is properly aligned for receipt by a tray.

In the modification of the invention illustrated in FIG. 10, there are located in the treating zone 70 through which the articles pass a plurality of generally horizontally extending, vertically spaced shelves or carrier plates 71. Extending completely about shelves 71 is a conveyor 72, which functions to present untreated articles at a plurality of levels in alignment with one end of shelves 71 for introduction of the articles to the shelves, and to receive treated articles from the shelves at a plurality of levels at the opposing ends of the shelves. In the apparatus illustrated, the conveyor 72 operates in clockwise direction and has a left hand up run and a right hand down run at opposing ends of the shelves. Conveyor 72, which may be constructed in the same manner as conveyor 13 of FIGS. 1–3, is provided with a plurality of equally spaced, rigid cross bars 73 which are approximately the same length as the width of shelves 71 to enable them to support the same number of articles (and also a tray) as may be accommodated by the shelves, measured in a transverse direction. These cross bars present flat tray-supporting sufaces on the up and down runs of the conveyor, and the distance between the flat supporting surfaces of adjacent cross bars is substantially equal to the distance between the load carrying surfaces of adjacent shelves 71. Thus, tray-supporting surfaces of the cross bars function as extensions of the shelves at each end of the latter when the cross bars are brought into registry with the shelves in the up and down runs.

The apparatus shown in FIG. 10 is also provided with a shelf 74 beneath shelves 71, the shelf being positioned in such a way that each end is confronted by the up and down runs by the conveyor 72, and a cross bar 73 in each of the runs is in registry therewith when the cross bars in the runs are also in registry with shelves 71.

Each of shelves 71 and 74 carries a complete complement of loaded trays 75 in abutting relationship. In addition, each of the cross bars 73 in the up run of the conveyor, including those in registry with shelves 71, contains a tray loaded with articles 76. The cross bars on the down run of the conveyor are empty with the exception of the two bottom-most cross bars, the cross bar in the bottom-most position carrying a tray loaded with untreated articles, and the cross bar next above carrying an empty tray.

To the left of the up run of conveyor 72 is a main multiple pusher 77 comprising a framework 78 mounted for translational motion. A pair of pressure cylinders 79 is connected to the framework to urge the framework forwardly when a loaded tray is on each of the cross bars 73 in registry with shelves 71. Framework 78 comprises an outwardly projecting pair of arms 80, at each level, having mounted therebetween elongated abutments 81 for engaging trays 75, which may have the same structural design as trays 18 of FIGS. 1–3. These abutments are in vertical alignment so that when the loading ram is advanced by the cylinder 79 the loaded trays at all levels are displaced onto shelves 71. This action of the main multiple pusher advances all of the trays along the shelves or carrier plates 71 one step equal to the width of a single tray, and in so doing the leading right hand tray of each full complement of trays on the shelves is displaced onto a cross bar 73 of the down run of conveyor 72.

Located to the right of conveyor 72 is an infeed line conveyor 82 which delivers untreated articles 76 to the conveyor 72. Conveyor 82 may operate in the same manner as infeed conveyor 45 of FIGS. 1–3 to bring a full tray complement of articles into position adjacent a tray 75 on a cross bar 73 of the down run of conveyor 72, so that the complete complement of articles may be displaced from the conveyor belt 82 onto an awaiting empty tray by means of an infeed pusher 83. Infeed pusher 83 may comprise a pair of rams 84 advanced by a pair of cylinders 85, the rams being interconnected by a pusher bar 86 for engaging the entire complement of articles. Infeed pusher 83 may also be elevated above infeed conveyor belt 82 during retraction to permit unhindered delivery of additional articles by belt 82 during this portion of the cycle of operation of pusher 83.

Situated immediately below infeed conveyor belt 82 is an infeed tray pusher 87 comprising a pair of rams 88 operated by a pair of cylinders 89, the rams being interconnected by means of a pusher bar 90 for engaging trays 75.

Immediately above infeed conveyor belt 82 is a tray tilting mechanism comprising a pair of arms 91 mounted for rotation on a shaft 92. The ends of arms 91 are joined by a rigid shaft for engaging one bottom edge of trays 75 to cause the trays to tilt, pivoting them about the longitudinal edge of cross bars 73. Movement of the arms 91 is caused by rotation of a cam 93 which is in contact therewith.

Opposite the tray tilting mechanism is a pair of arcuate abutments 94 having a configuration similar to abutments 34 of FIG. 4, which abutments or stops prevent the trays from being displaced from the cross bars during tilting, and properly align the trays on the cross bars after tilting when the conveyor is advanced.

Tilting of trays 75 by means of the tilting mechanism causes the treated articles to slide onto an outfeed or discharge conveyor by which they are removed to a place generally remote from the treating zone.

Operation of the apparatus of FIG. 10 is as follows. Each of the shelves 71 and shelf 74 supports a full complement of filled trays 75, and each of the cross bars 73 in the left hand up run portion of the conveyor 72 which are in registry with shelves 71 also contain a loaded tray. A full complement of untreated articles is on infeed conveyor belt 82 ready to be displaced onto an empty tray in the right hand down run portion of conveyor 72. A loaded tray is on the bottom-most cross bar of the down run portion of conveyor 72.

At the moment of operation shown in FIG. 10, conveyor 72 and infeed conveyor 82 are at rest. During this lull in motion of the two conveyors, multiple pusher 77 pushes a loaded tray 75 onto shelves 71 at each level and advances each full complement of trays on shelves 71 one increment equal to the width of a single tray. In so doing the leading tray in each complete complement of trays on shelves 71 is displaced onto a cross bar 73 of the right hand down run of conveyor 72.

At the same time, infeed pusher 83 delivers a full compement of artices onto an empty tray 75 on a cross bar in the down run of the conveyor 72, and tray infeed pusher 87 displaces a loaded tray from the bottom-most cross bar of the down run portion of conveyor 72 onto shelf 74, thereby advancing the entire full complement of loaded trays on shelf 75 the width of a single tray. This causes the leading tray in the full complement of trays on shelf 74 to be displaced onto the bottom-most cross bar of the left hand up run of conveyor 72.

At approximately the same instant, or an instant before, but during the lull in the intermittent movement of conveyor 72, cam 93 is rotated to tilt a tray so as to displace the article therefrom onto outfeed conveyor 95.

After the various pushers have performed in the manner described, the conveyor 72 is advanced one step in a clockwise direction, the movement being equivalent to the distance between shelves 71. Each of pushers 83 and 87 operate as before, the latter pushing a tray onto shelf 74, which tray has been loaded with articles by infeed pusher 83 during the immediately previous lull in motion of conveyor 72. Pushers 83 and 87 and tray tilting mechanism may be actuated when a full complement of articles has been delivered by infeed conveyor 82, as for example by means of the switch 65 and timing wheel 62 of FIGS. 3, 7, 8 and 9.

Gang pusher 77 does not operate until a loaded tray is again in registry with each of shelves 71 in the left hand up run of conveyor 72. In other words, in the apparatus illustrated in FIG. 10 the operation described in the preceding paragraph takes place six times, the gang pusher operating every sixth lull.

The tilting mechanism operates during each lull in the intermittent motion of conveyor 72.

The step-by-step advancement of conveyor 72 may be actuated through switch means, not shown, engaged by infeed pusher 83 just prior to the completion of its cycle of operations.

The modification of the apparatus of this invention shown in FIG. 11 is generally similar to that illustrated in FIGS. 1–3, with the exception that the means for removing treated articles from the trays and return of empty trays to receive another complement of untreated articles has been changed, and carrier rollers are employed instead of carrier plates.

Referring to the figure, a conveyor 100 which operates in a counterclockwise direction and has a right hand up run and a left hand down run surrounds a plurality of equally vertically spaced levels comprising rows of transversely extending rollers 101 which serve the same function as carrier plates 12 of FIGS. 1–3, but provide for reduced frictional contact with the trays they support. The position of the various components of the apparatus is during a lull in the intermittent motion of conveyor 100 and that in which articles 104 are shown on the infeed conveyor 103 ready to be pushed by the infeed pusher 105, which may have a construction similar to that of infeed pushers previously described, onto the empty tray 106 located just below the infeed conveyor level. The cross bars 107 of the right conveyor up run have loaded trays thereon. The six roller carriers 101 are fully loaded, and the cross bars of the left conveyor down run are empty. Previously, but during this same lull in movement of conveyor 100, the left hand push-puller 108, which comprises a cylinder 109 and a ram 110 provided with a latch 111 located a distance from the end of ram 110 at least as great as the width of articles 104, had pushed an article to the left off a tray on the lowermost cross bar of the down run onto the outfeed conveyor 112, and on its return stroke latch 111 had engaged the flange of the now empty tray and pulled the tray to the right off the cross bar of the conveyor and onto the bottom roller carrier 113 to the position shown. This movement of push-puller 108 advanced the right hand leading empty tray of the full complement of trays on roller carrier 113 into position on the bottom-most cross bar of the conveyor up run ready to receive articles as shown. The right hand multiple pusher 114, which may be similar to those described above, pushes the loaded trays from the cross bars of the up run of the conveyor 100 which are in registry with roller carriers 101 onto the roller carriers. This moves each full complement of loaded trays on the carrier rollers 101 to the left a distance equal to the width of one tray so that the leading left hand loaded trays at each level are moved onto cross bars 107 of the left hand conveyor down run. During the same lull in movement of conveyor 100, infeed pusher 105 delivers a complete complement of articles onto the empty tray 106 on the bottom-most cross bar of the right hand up run of conveyor 100.

Next, the conveyor 100 is advanced one step to move the lowermost loaded tray of the right up run to the level of the lowermost of the six roller carriers 101. This also moves the left conveyor run down one step to bring the lowermost loaded tray in alignment with the bottom return roller carrier level 113 and with the outfeed conveyor. During the following lull in movement of conveyor 100 the push-puller 108 moves articles from the latter tray onto the outfeed conveyor 112, and pulls the empty tray to the right thus advancing all of the empty trays one step on return roller carrier 113, and moving the leading tray onto the lowermost, now empty, cross bar of the up run of the conveyor 100, ready to receive articles from the infeed conveyor 103, which are displaced therefrom by infeed pusher 105 onto the empty tray as soon as the tray comes to rest.

The cycle described in the preceding paragraph repeats during each lull in the operation of conveyor 100, gang pusher 114 operating every sixth lull.

The operation of the apparatus of FIG. 11 can be tied in with the operation of infeed conveyor 103 in the same manner as the apparatus described in FIGS. 1–3.

In the embodiment of the invention illustrated in FIGURES 12, 13 and 14, instead of employing an endless conveyor of the type of the previous forms which surrounds the treating zone, there are a pair of transversely spaced conveyors 120 at each end of the treating zone 121. These conveyors have vertically spaced angle irons 122 for supporting the trays as shown in FIG. 13. The inner runs of the right hand conveyors move down and the inner runs of the left hand conveyor move up (see FIG. 12).

Situated within treating zone 121 are eleven vertically spaced pairs of angle irons 123 which support trays 124 at each end. These trays are provided with wheels 125 which ride on the inwardly extending flanges of angle irons 123.

Located within the treating zone 121 and beneath angle irons 123 is a pair of angle irons 126 for likewise supporting trays 124.

The selected position of the apparatus is that in which all of the pairs of angle irons 122 of the right inner down runs support loaded trays 124, with the exception of the bottom-most pair which support an empty tray, and the uppermost pair which are unloaded. The angle irons 123 at each level support a full complement of loaded trays; the angle irons 122 of the left hand up runs are unloaded with the exception of the pair next to the bottom which support a loaded tray.

The infeed conveyor 127 is loaded with articles; the outfeed conveyor 128 is unloaded, and the lowermost infeed pair of angle irons 126 support a complete complement of loaded trays.

During this lull in the operation of conveyors 120, the outfeed pusher 129 pushes the articles to the left from the tray at the outfeed level onto the outfeed conveyor 128, and the infeed pusher 130 pushes the articles from the infeed conveyor onto the unloaded lowermost tray. The tray infeed pusher 131 then pushes the now loaded tray from the conveyor onto the bottom infeed carrier angle irons 126 and advances the complete complement of loaded trays thereon to the left, one step equal to one tray width, thereby advancing the leading left loaded tray onto the lowermost pair of angle irons 122 of the left hand conveyors.

Next, the right conveyor moves down one step to move the next to the bottom unloaded tray into alignment with the infeed conveyor and also moves a loaded tray into alignment with the outfeed conveyor. At the same time the left hand conveyor moves up one step to move the next to the bottom loaded tray into alignment with the lowermost pair of angle irons 123, and also of course moving the previously advanced loaded tray up one step.

The above operations are repeated until eleven loaded trays are in alignment with the left end of the eleven pairs of carrier angle irons 123, and until eleven pairs of empty angle irons of the right hand conveyors are in alignment with the right end of the eleven carrier angle irons 123.

During the next lull in the operation of the conveyors 120 the left hand multiple pusher 131 pushes the loaded trays from the left hand conveyors onto the carrier angle irons 123, thus pushing the right hand leading loaded trays of the full complement of trays onto the empty angle irons of the right hand conveyors. The operations described above are then repeated.

It will be noted that in FIGURE 12 the parts are shown in the position they assume after the right hand conveyors have moved down one step and after the left hand conveyors have moved up one step after operation of the multiple pusher 131, and in which the outfeed, infeed and tray pushers are ready for operation. The outfeed and infeed conveyors may be operated simultaneously, but the tray pusher does not operate until after the infeed pusher has pushed the articles onto the aligned empty tray. In order for the infeed pusher and tray pusher to operate in proper sequence, the infeed pusher may engage a limit switch (not shown) during its cycle of operation, which switch actuates the tray pusher.

The apparatus illustrated in FIG. 12a is another form of the general type of apparatus shown in FIGS. 12, 13 and 14. As can be seen with reference to the drawing, instead of recirculating the trays, which are similar to those illustrated in FIG. 14, at a single level, the trays are recirculated back through the treating zone at a plurality of levels. The loaded trays are displaced from the left hand pair of conveyors 230, only one of which is shown, at a plurality of levels, six levels being illustrated, defined by spaced pairs of tracks 231 by means of a gang pusher 232. This pusher advances the trays at each level the width of a single tray, and the leading tray of the full complement of trays supported by each of track pairs 231 is displaced onto right hand pair of conveyors 233. Thereafter, conveyor pair 233 raises all six loaded trays so that a loaded tray is in registry with spaced pairs of tracks 234 at all six levels. Gang pusher 235 then displaces the six trays from conveyor pair 233 onto tracks 234 at each level, and the leading tray of each full complement of trays supported by spaced pairs of tracks 234 is displaced onto the left hand pair of conveyors 230.

Unloading and loading of trays supported by conveyor pair 230 is accomplished by a pusher 236, one arm 237 of which displaces treated articles from trays in registry with outfeed belt 238 and the other arm 239 simultaneously displaces a tray load of untreated articles from infeed conveyor belt 240 onto an awaiting empty tray in registry therewith.

Conveyor pair 230 advances downward stepwise, one level at a time, and loading and unloading of the trays takes place simultaneously during each lull in the intermittent motion of the conveyors 230. Every sixth lull, gang pusher 232 operates for there is then a tray load of untreated articles in registry with track pairs 231 at each of the six levels. During this same lull in the operation of conveyor pair 230, conveyor pair 233 raises the trays displaced thereon at each of the six levels by gang pusher 232 into registry with the six track levels 234. Gang pusher 235 then pushes these trays onto track pairs 234 and the leading trays on track pairs 234 are displaced onto conveyor pair 230. Conveyor pair 230 is again advanced stepwise to effect unloading of treated articles from the trays and loading of untreated articles onto the awaiting empty tray from which treated articles have been displaced during the previous lull in the intermittent motion of conveyor pair 230.

A particular advantage of the apparatus illustrated in FIGS. 12, 12a and 13 is that they provide for easy access of personnel into the treating zone for the purpose of cleaning or making repairs. To obtain such access one merely has to remove the trays; thus, dismantling of equipment is avoided.

The apparatus shown in FIG. 15 is similar in operation to that of FIGURE 1 and, therefore, only the lower portion of the system has been shown. This form of the invention employs corrugated non-flanged, reinforced trays 140, suitable for supporting hot baking goods such as bread, and a modified infeed and outfeed arrangement. The cross bars of the right hand up run of conveyor 141 all support loaded trays with the exception of the bottom-most one, and the carrier plates 142 support a full complement of loaded trays. The cross bars of the left hand conveyor down run are unloaded with the exception of the next to the bottom two; the bottom return carrier plate 143 carries a full complement of loaded trays, and the hinged infeed-outfeed gate 144 operated by cylinder 145 is shown in its outfeed position in full lines and in its infeed position in dotted lines.

During the lull in the intermittent motion of conveyor 141, the outfeed pusher 146 pushes the articles off the aligned tray and the articles ride down the inclined gate and onto the outfeed conveyor 147. Next the gate is moved to level position and the infeed pusher 148 pushes articles from the infeed conveyor 149 onto the now unloaded aligned tray. During the same lull, the multiple tray pusher 150 pushes the loaded trays off the cross bars 151 of the conveyor up run which are in register with carrier plates 142 and onto the carrier plates, thus moving the entire complement of loaded trays on carrier plates 142, whereby the leading left hand loaded trays are displaced onto the empty cross bars 151 of the conveyor down run. During this same lull in the intermittent operation of conveyor 141, tray return pusher 152 displaces the bottom-most loaded tray of the left hand down run of conveyor 141 onto tray return shelf 143, thereby advancing the complete complement of loaded trays on shelf 143 one increment equal to the width of a single tray, and the leading right hand tray is displaced onto the empty cross bar 151 in the bottommost position of the right hand conveyor up run.

Next, the conveyor moves one step counterclockwise to move the now loaded tray at the infeed level up to the level of the lowermost carrier plate 142, and to move the lowermost loaded tray of the conveyor right hand up run up to the infeed-outfeed level. At the same time, the loaded tray on the cross bar immediately above the bottom-most position of the left conveyor down run is lowered to the level of the bottom return carrier plate 143, and of course all of the other loaded cross bars of the down run lower the loaded trays one step.

During the succeeding lull in the intermittent motion of conveyor 141, the left hand return pusher 152 pushes the lowered loaded tray to the right off the cross bar and onto the bottom return carrier plate 143, thus moving all of the loaded trays on this plate to the right so that the right hand leading loaded tray is pushed onto the aligned empty bottom cross bar of the conveyor up run. The outfeed pusher 146 pushes articles off the aligned tray, and the articles ride down the inclined gate onto outfeed conveyor 147. Thereafter during the same lull infeed-outfeed gate 144 raises to a level position and infeed pusher 148 pushes a full complement of articles from infeed conveyor 149 onto the now empty tray.

The procedure described in the two paragraphs immediately preceding is repated over and over, gang pusher 150 operating every so many cycles when a loaded tray on the cross bars of the up run of conveyor 141 is in registry with each of carrier plates 142.

The operation of FIG. 15 may be controlled by operation of infeed conveyor 149 in a manner general similar to that shown in FIG. 3. However, the timing wheel may operate outfeed pusher 146, which through suitable switch mechanism (not shown) may actuate gate 144 to the raised position and cause operation of infeed pusher 148. Infeed pusher may trip a switch just before assuming the at-rest position in the cycle of its operation to cause gate 144 to drop and to advance the conveyor 141 one step.

In FIGURE 16 triangular cross bars 160 are employed, and no trays are used. The triangular cross bars 160 of conveyor 161 present horizontal article supporting surfaces on the right hand up run of conveyor 161 and downwardly tapered or sloping surfaces on the left hand down run. Vertically spaced substantially horizontal carrier plates or shelves 162 are provided with a downwardly extending flange 163 at their left hand end, the angle the flange makes with the horizontal plane being such that it has substantially the same slope as the sloping side of cross bars 160 of the down run. Thus, when the cross bars 160 are in registry with carrier plates 162, each flange 163 lies in the same plane as the sloping surface of a cross bar in registry with the carrier plate immediately below. Flanges 163 and the sloping sides of cross bars 160, therefore, form a continuous sloping surface down which the article may slide. Although the carrier plates 162 are shown as being substantially horizontal, they may slant downwardly from the entrance to the discharge end. In this arrangement the downwardly extending flanges 163 on the discharge end thereof could be eliminated and the slope of the carrier plates would be such as to extend between a cross bar in the up run and the sloping surface of a cross bar in the down run which is one level below. In other words, the carrier plates would extend between the same cross bars in the up and down runs as they do in FIG. 16 by reason of flanges 163.

The right hand multiple pusher 164 has just been actuated to move the articles from the flat side of the triangular cross bars 160 of the right conveyor up run onto the carrier plate 162. This advances the articles on the carrier plates to the left and the leading left hand articles are pushed down the inclined end 163 of the plates, and down the inclined face of the conveyor cross members of the left down run, and, with the exception of articles from the bottom-most carrier plate, come to rest against a vertically extending abutment 163a, which prevents the articles from sliding off of the sloping surface of the cross bars. The articles from the lowermost shelf 162 continue along this inclined face for delivery onto the adjacent outfeed conveyor 165. At about the same time during this lull in movement of conveyor 161, the infeed pusher 166 pushes articles from infeed conveyor 167 onto the upper flat face of the lowermost cross bar of the right hand up run.

Thereafter, the conveyor is advanced counterclockwise one step to bring this newly loaded cross bar up into alignment with the lowermost carrier plate. At the same time the next to the bottom cross bar of the left hand down run moves down one step to discharge its articles angularly downward onto the outfeed conveyor. This sequence described in this paragraph repeats over and over, the multiple pusher operating only when articles are in alignment with all of the carrier plates at the infeed end, at which time all of the articles on the cross bars of the left down run have been emptied onto the outfeed conveyor.

The apparatus illustrated in FIG. 17, like that of FIG. 16, does not employ trays for supporting the articles Vertically spaced, substantially horizontal carrier plates 170, each of which support a full complement of articles in abutting relation, are confronted at each end with conveyors 171 and 172. Right hand conveyor 171 operates in a clockwise direction and left hand conveyor 172 operates in a clockwise direction. Carrier plates 170, rather than being horizontal, may slant down wardly from the entrance end to the discharge end so as to connect cross bars of the right hand conveyor with cross bars at a lower level in the left hand conveyor.

Located within right hand conveyor 171 is a multiple pusher 173, an infeed pusher 174 and an infeed conveyor belt 175. Situated within left hand conveyor 172 is an outfeed conveyor 176. Below carrier plates 170 and opposite outfeed conveyor 176 is an outfeed pusher 177.

Operation of the apparatus of FIG. 17 is as follows. The apparatus is shown in a position during the lull in the intermittent motion of conveyors 171 and 172. Each of the cross bars of the up run portion of right hand conveyor 171 in registry with a carrier plate 170 contains a full complement of articles. The cross bar of the up run of conveyor 171 adjacent infeed conveyor 175 is empty and ready to receive a full complement of articles from the infeed conveyor. All of the cross bars of the down run portion of conveyor 172 in registry with carrier plates 170 are empty. The carrier plate of the down run adjacent outfeed pusher 177 carries a full complement of articles.

At this time, infeed pusher 174 displaces a complete complement of articles onto the empty cross bar adjacent infeed conveyor 175, and outfeed pusher 177 displaces the full complement of articles from the cross bar of the down run of conveyor 172 onto outfeed conveyor 176. At approximately the same time, multiple pusher 173 displaces the articles on the shelves of the up run of conveyor 171 in registry with carrier plates 170 onto the carrier plates, whereby the entire complement of articles on each carrier plate is advanced one increment equivalent to the width of an article and the leading left hand article at each level are displaced onto the empty cross bars of the down run portion of conveyor 172.

The conveyors 171 and 172 are advanced intermittently, step-by-step, and during the lull between movement of the conveyors the infeed pusher 174 and the outfeed pusher 177 function as above. However, multiple pusher 173 operates only at such time when each of the cross bars of the up run portion of conveyor 173 in registry with a carrier plate 170 carries a full complement of articles.

There has been previously described with reference to FIGS. 3, 7, 8 and 9 infeed conveyor means for properly positioning a full tray load of articles on a conveyor belt for displacement onto a tray of the loading mechanism for the treating zone. In FIGS. 18 and 19 there are illustrated diagrammatically somewhat different arrangements for obtaining the same result.

Referring to FIG. 18, a line conveyor belt 180 continuously delivers equally spaced articles A from a packaging, or processing operation, or the like. The equal spacing of packages A on line conveyor belt 180 may be aided by providing conveyor 180 with equally spaced transversely extending abutments, not shown. A second conveyor belt 181 is located in abutting relation along side conveyor belt 180 so that the two belts overlap and are coextensive for a substantial distance. A pusher 182 comprising a pair of rams 183 connected at their outer ends by a pusher bar 185 and operated by cylinders 184 operates to transfer articles from conveyor 180 to conveyor 181.

Conveyor belts 180 and 181 travel in the same direction, and are coextensive for a distance sufficient to permit an entire complement of articles A which may be accommodated by a tray (eleven in the drawing) to be displaced from one belt to the other. Pusher bar 185 is of sufficient length to engage such a full complement of articles A.

Each time conveyor belt 180 delivers a tray load of spaced articles A to that portion of the conveyor belt which is coextensive with conveyor belt 181, pusher 182 is actuated, as for example by the leading article A coming into contact with a limit switch, not shown, which may be connected to a solenoid valve such as valve 66 of FIG. 3, by suitable timing mechanism connected to conveyor belt 180, or by other suitable means, and the entire complement of article A is transferred from conveyor belt 180 to conveyor belt 181 by means of pusher bar 185.

Because pusher 182 reciprocates in a horizontal plane across continuously moving conveyor belt 180 in displacing the articles thereon to belt 181, it should elevate on retraction to permit belt 180 to deliver additional articles in an unhindered manner, otherwise it would engage the leading articles of the immediately succeeding complement of articles delivered by conveyor belt 180 if this belt is operated at relatively high speed. Conveyor belt 180 travels at a linear speed which is less than that of conveyor belt 181. For example, conveyor belt 180 may travel at a linear speed of about 60 feet per minute and conveyor belt 181 may travel at a linear speed of 65 feet per minute. Due to the greater speed of conveyor belt 181, a gap is created between each tray load of articles displaced from conveyor belt 180 to conveyor belt 181, which gap is greater than the distance between adjoining articles on conveyor belt 180. In this connection this greater distance is indicated by the letter X in the figure.

Conveyor belts 186 and 187 are in line with conveyor belt 181 and form a continuation of the path through which the articles are carried by conveyor belt 181. Conveyor belts 186 and 187 travel at the same speed which is less than that of conveyor belt 181. Thus, when articles pass from conveyor belt 181 to conveyor belt 186 the spacing between the articles is decreased. However, the greater spacing, although reduced, is maintained between each tray load of articles. See articles B on conveyors 186 and 187.

Conveyor belt 186, which operates continuously, transports the articles onto conveyor belt 187. Conveyor belt 187 operates intermittently so that after a full tray load of articles B has been delivered to conveyor 187 and is properly aligned between the ends of a tray the conveyor comes to rest and pusher 188 comprising rams 189 connected at their exterior ends by a pusher bar 191 and operated by cylinders 190 is actuated to deliver the tray load of articles B onto a tray not shown.

In FIG. 18, articles A and B have been advanced to such a position that pushers 182 and 188 are ready to be actuated. Actuation of pusher 188 takes place during the lull in the intermittent motion of the conveyor means described heretofore for loading the treating zone with articles at a plurality of levels.

In the arrangement in FIG. 19, a continuously operating line conveyor belt 200 which may comprise two spaced apart belts, delivers randomly spaced articles, which may be of different sizes. Conveyor belt 200 is located in line and in end abutting relation with an infeed conveyor belt 201, which may also comprise two spaced apart belts, and which travels in the same direction as belt 200. However, belt 201 is operated intermittently by means of motor 202 which is connected to a 220 volt, 3 cycle power source 203 through a solenoid actuated switch 204. When an article is advanced to the end of conveyor 200 it contacts feeler arm 206 of switch 205, which feeler arm extends upwardly through the space between the parallel belts of conveyor 200, closing the switch, which remains closed until the article has passed entirely over and is free of arm 206. Closing of switch 205 completes the circuit through solenoid switch 204, which is actuated thereby completing the circuit to motor 202, which operates conveyor 201 through a suitable belt and pulley arrangement, or the like. When the article has been advanced by conveyor 201 so that it no longer is in contact with arm 206 of switch 205, solenoid switch 204 is de-energized and circuit to motor 202 is disconnected so that movement of belt 201 ceases.

The spacing between articles on belt 201 can be varied by having belts 200 and 201 operate at different speeds or by varying the horizontal length of feeler arm 206 to increase or decrease the time of contact of an article with the arm.

Extending lengthwise of conveyor 201 is a pusher bar 210, so located as to be capable of displacing articles from conveyor 201 onto a tray, not shown, as for example in the manner illustrated in FIGS. 1, 10, 11, 12 and 15. Pusher bar 210 may be operated by hydraulic cylinders which are actuated when articles are properly aligned on conveyor 201 between the ends of the pusher bar. In order for pusher bar to be actuated at the proper time and not become jammed by articles extending beyond the extreme ends thereof, two switches 211 and 212 are located in the proximity of the ends of the pusher bar, both of which switches must be closed in order for solenoid operated valve 213 to actuate the hydraulic cylinders of pusher bar 210.

Switch 211 is normally closed and is opened by articles coming in contact with the feeler arm thereof, which may extend upwardly between the spaced belts forming conveyor 201. Switch 212 is normally open until closed by contact with an article coming in contact with its feeler arm, which may also extend upwardly between the parallel belts. Electric eye devices may be employed in place of the feeler arm arrangements.

When a leading article closes switch 212, the circuit including solenoid switch 215, which is connected to a 110 volt source 214 is completed. Solenoid switch has two poles. Pole 215a is connected in parallel with switch 212 so that once the circuit is completed switch 212 is shorted out and the solenoid remains energized.

Pole 215b of solenoid switch 215 is connected in series with two pole solenoid switch 216, pole 216a of which operates solenoid valve 213 to actuate pusher arm 210.

Pole 216b completes a holding circuit in parallel with the circuit through the coil of solenoid switch 216.

In order to actuate solenoid switch 216, switch 211, which is normally closed, must be free of contact by an article so that it is closed. When both switches 211 and 212 are closed, pusher bar 210 is actuated through valve 213 and articles are displaced from belt 201 onto an empty tray.

As indicated above switch 211 is so located that an article in contact therewith may jam the apparatus if the pusher bar was then actuated. However, once the switch 211 is closed by the article passing free thereof, and switch 212 is also closed by contact with the leading article of the series of articles on conveyor 201, pusher bar 210 is actuated in the manner described.

Switch 212 is located a short distance within the end of pusher bar 210 so that conveyor 201 can be further advanced for an article to clear switch 211 without the leading article extending beyond the end of pusher bar 210 and becoming jammed during its operation.

The holding circuit through pole 215a of solenoid switch 215 is for the purpose of keeping the switch energized, should the leading package have relatively small dimensions and be capable of being further advanced by conveyor 201 so as to no longer be in contact with the feeler arm of switch 212, yet be within the end of pusher bar 210.

The holding circuits of both of solenoid switches 215 and 216 also serve to maintain the circuit closed to make possible the complete cycle of operation of pusher 210. Without these holding circuits, as soon as pusher bar 210 displaced the leading article of the series from contact with switch 212, the circuit to solenoid valve 213 would be disrupted and further movement of the pusher bar would be prevented. This of course would prevent articles from being displaced properly onto a tray.

The circuit which actuates pusher bar 210 remains closed until the pusher bar is nearly in the retracted position at which time the pusher may engage and momentarily open a switch 217, which is normally closed and in series with switches 211 and 212, thereby breaking the circuit.

In operation of the apparatus of FIG. 19, randomly spaced articles, which may vary in size, are continuously delivered by means of conveyor 200. As each article comes in contact with feeler arm 206 of switch 205, motor 202 is actuated to advance belt 201. The article is advanced by belt 201 until the circuit to motor 202 is disrupted by the article moving free of feeler arm 206. This operation is repeated several times by each succeeding article delivered by conveyor 200 until the leading article closes switch 212. If when the leading article closes switch 212, switch 211 is free from contact with an article, and thus closed, pusher bar 210 is actuated in the manner described and the articles are displaced from conveyor 201 onto a tray. On the other hand, if switch 211 is open by contact with an article, pusher bar 210 does not operate until that article is no longer in contact with switch 211 by further advancement of belt 201 by presentation of another article into contact with feeler arm 206 of switch 205.

Although belt 201 has been described as having intermittent operation, it may operate continuously, generally as a slower rate than belt 200 in order to decrease the distance between adjacent articles, which may normally be rather widely spaced on conveyor 200, and to give pusher bar more time in which to complete its cycle of operation so as not to come into contact with the leading article of the succeeding series of articles entering belt 201.

The devices of FIGS. 18 and 19 may be combined with any of the apparatus of FIGS. 1–3 and 10–17 to feed articles thereto and to actuate the various pushers.

Means for actuating the various pushers, tray tilting mechanism, etc. in proper sequence, and for advancing the loading mechanism for the plurality of vertically spaced means for supporting articles in the treating zone have been described with reference to the various figures. Various equivalent actuating mechanism may also be employed, but are not described as they form no part of the invention and are readily apparent to persons skilled in the art.

While there have been shown and described certain particular embodiments of the invention, it will be obvious to those skilled in the art that changes and modifications may be made without departing from the invention, and that it is intended by the appended claims to cover all such changes and modifications as fall within the true spirit and scope of the invention.

I claim:
1. Conveyor apparatus comprising means for supporting a full complement of aligned articles disposed in successively abutting relation at a plurality of vertically spaced levels during movement of the articles from the entry end to the discharge end of a treating zone, conveyor means having a vertical run thereof in confronting relation with the entry end of said treating zone operable to present a number of articles less than a full complement of articles to said treating zone at each of said levels and a vertical run thereof confronting said discharge end of said treating zone operable to receive a number of articles less than a full complement of articles from said treating zone at each of said levels, said conveyor means having a series of spaced means for supporting said articles, the spacing between article supporting means of said conveyor means corresponding to the spacing between article supporting means of said treating zone, means for advancing said conveyor means intermittently, means operable during the lull in the intermittent motion of said conveyor means to load article supporting means in the vertical run thereof confronting the entry end of said treating zone, means associated with said vertical run of said conveyor means confronting said discharge end of said treating zone for unloading article supporting means thereof, and means operable during the lull in the intermittent motion of said conveyor means for displacing a number of articles less than said full complement of articles from said vertical run of said conveyor means confronting the entry end of said treating zone to said treat- ing zone at each of said levels simultaneously and to advance the series of said articles at each of said levels in said treating zone longitudinally thereof a distance to discharge therefrom and onto said vertical run of said conveyor means confronting the discharge end of said treating zone at each of said levels a like number of leading articles when the vertical run of said conveyor means confronting the entry end of said treating zone presents an article at each of said levels of said treating zone.

2. Apparatus according to claim 1 in which said conveyor means surrounds said treating zone.

3. Apparatus according to claim 1 in which means for supporting articles at a plurality of vertically spaced levels in said treating zone comprises a plurality of vertically spaced substantially horizontal shelves comprising a series of transversely extending roller means.

4. Apparatus according to claim 1 in which said means for loading said article supporting means of said conveyor means comprises article infeed conveyor means extending transversely of said conveyor means and in registry with article supporting means in a vertical run of said conveyor means when article supporting means thereof are in registry with said article supporting means of said treating zone, pusher means having article-engaging means extending longitudinally of said infeed conveyor means operable to displace articles from said infeed conveyor means onto article support means of said conveyor means in registry therewith during the lull in the intermittent motion of said conveyor means, means to advance said infeed conveyor means, and means to actuate said pusher means responsive to the presentation of articles in registry with said article-engaging means of said pusher means.

5. Conveyor apparatus comprising means for supporting a full complement of aligned article-carrying trays disposed in successively abutting relation at a plurality of vertically spaced levels during movement of the trays from the entry end to the discharge end of a treating zone, conveyor means having a vertical run thereof in confronting relation with the entry end of said treating zone operable to present a tray loaded with articles to be treated at each of said levels and a vertical run thereof confronting said discharge end of said treating zone operable to receive a tray from said treating zone at each of said levels, said conveyor means having a series of spaced means for supporting said trays, the spacing between tray supporting means of said conveyor means corresponding to the spacing between the tray supporting means of said treating zone, means for advancing said conveyor intermittently, pusher means operable during the lull in the intermittent motion of said conveyor means for displacing a tray of articles to be treated from said vertical run of said conveyor means confronting the entry end of said treating zone to said treating zone at each of said levels simultaneously and to advance the series of said trays at each of said levels in said treating zone longitudinally thereof a distance to discharge therefrom and onto said vertical run of said conveyor means confronting the discharge end of said treating zone at each level the leading tray of treated articles when the vertical run of said conveyor means confronting the entry end of said treating zone presents a loaded tray at each of said levels of said treating zone, means for unloading treated articles from said trays during the lull in the intermittent motion of said conveyor means, means for loading untreated articles onto an empty tray during the lull in the intermittent motion of said conveyor means, and tray recirculation means extending between said vertical runs of said conveyor means for supporting a full complement of aligned trays disposed in successively abutting relation having means associated therewith for displacing a tray from said vertical run of said conveyor means confronting the discharge end of said treating zone onto said tray supporting means and for advancing said series of trays longitudinally a distance to discharge therefrom and onto the opposing vertical run the leading tray, whereby said trays are returned for subsequent passage through said treating zone.

6. Apparatus according to claim 5 in which said means for loading trays with articles comprises article infeed conveyor means extending transversely of said conveyor means and in registry with an empty tray in a vertical run of said conveyor means when trays in a vertical run are in registry with said tray supporting means of said treating zone, pusher means having article-engaging means extending longitudinally of said infeed conveyor means operable to displace articles from said infeed conveyor means onto an empty tray in registry therewith during the lull in the intermittent motion of said conveyor means, means to advance said infeed conveyor means, and means to actuate said pusher means responsive to the presentation of a tray load of articles in registry with said article-engaging means of said pusher means.

7. Conveyor apparatus comprising a plurality of vertically spaced substantially horizontal carrier plates for supporting a full complement of aligned articles disposed in successively abutting relation during the movement of the articles from the entry end to the discharge end of a treating zone, each of said carrier plates having a downwardly sloping portion at the discharge end thereof, loading and unloading mechanism for said carrier plates comprising an endless conveyor surrounding said carrier plates and having a vertical up run thereof in confronting relation with the entry end of said treating zone operable to present a number of articles less than a full complement of articles to said treating zone at the level of each of said carrier plates and a vertical down run in confronting relation with the exit end of said treating zone operable to receive a number of articles less than a full complement of articles from each of said carrier plates, said conveyor having a series of spaced supports, each of said supports being secured to said conveyor in such way and having a configuration such that said supports present substantially horizontal article supporting surfaces in the vertical up run of said conveyor and sloping surfaces extending downwardly and away from said carrier plates in the vertical down run, the spacing of the horizontal surfaces of said supports corresponding to that of said carrier plates and the slanting surfaces of such supports forming a continuation of the downwardly sloping surfaces of said carrier plates when said horizontal surfaces of said supports in said vertical up run are in registry with said carrier plates, means to advance said conveyor intermittently, article infeed conveyor means at a level below said carrier plates and extending transversely thereof adjacent said supports in the vertical up run of said conveyor, the article supporting surface of said article infeed conveyor means lying in substantially the same plane as the horizontal surface of a support when said supports are in registry with said carrier plates, article infeed pusher means operable to displace articles from said article infeed conveyor means onto a support during the lull in the intermittent motion of said conveyor, pusher means operable during the lull in the intermittent motion of said conveyor to engage said articles on said supports in the up run of said conveyor and displace them simultaneously onto said carrier plates and to advance the series of articles on each of said carrier plates in said treating zone longitudinally thereof a distance to discharge therefrom and onto the sloping surfaces of the supports of the down run of said conveyor a like number of leading articles when a loaded support of the vertical up run is in registry with each of said carrier plates, and means adjacent said vertical down run of said conveyor operable to prevent articles on the sloping surfaces of the supports from being dislodged from said supports until a support is in registry with article discharge means.

8. Apparatus according to claim 7 including means to advance said infeed conveyor means intermittently stepwise including actuating means responsive to presentation of an article to said infeed conveyor means, and means operable to actuate said pusher means upon presentation of a support-load of articles in registry with said pusher means.

9. Apparatus according to claim 8 including a series of conveyor belts for delivering articles to said loading mechanism for said carrier plates and comprising a continuously operable first conveyor belt for delivering substantially equally spaced articles, a continuously operable second conveyor belt in side-by-side relation to said first conveyor belt, said second conveyor belt traveling at a greater linear speed than said first conveyor belt, a continuously operable third conveyor belt, and an intermittently operable fourth conveyor belt, said second, third and fourth conveyor belts defining a continuous path for said articles, said fourth conveyor belt extending transversely of the up run of said conveyor, a support of said conveyor being in registry therewith when supports of said up run are in registry with said carrier plates, a first pusher means operable to displace each support-load of articles presented in registry therewith from said first to said second conveyor belt, whereby a spacing is obtained between each support-load of articles displaced from said first conveyor belt onto said second conveyor belt, said third conveyor belt traveling at a linear speed less than said second conveyor belt whereby the spacing between articles and each support-load of articles is decreased, a second pusher means having article-engaging means extending longitudinally of said fourth conveyor belt operable during the lull in the intermittent motion of said conveyor to displace a support-load of articles from said fourth conveyor belt onto a support in registry therewith, and means operable to cease movement of said fourth belt and actuate said second pusher means upon presentation of a support-load of articles in registry with said article-engaging means of said second pusher means.

10. Apparatus according to claim 7 including first and second conveyor belts defining a path for delivery of articles to said loading mechanism for said carrier plates, said second conveyor belt extending transversely of said up run of said conveyor, pusher means having article-engaging means extending longitudinally of said second conveyor belt, means operable to advance second conveyor belt intermittently stepwise including actuating means therefor responsive to presentation of an article to said second conveyor belt, and means operable to actuate said pusher means upon presentation of a support-load of articles in registry with said article-engaging means of said pusher including a first sensing means for determining when the leading article of each support load of articles delivered by said second conveyor belt has advanced toward but within the end of said article engaging member and a second sensing means for determining when the last article of the series of articles comprising a support-load has advanced within the other end of said article-engaging means.

11. Apparatus according to claim 7 including first and second conveyor belts defining a path for delivery of articles to said loading mechanism for said carrier plates, said second conveyor belt extending transversely of said up run of said conveyor, pusher means having article-engaging means extending longitudinally of said second conveyor belt, means operable to advance said second conveyor belt intermittently stepwise including actuating means therefor responsive to presentation of an article to said second conveyor belt and timing means for discontinuing the advancement of said second conveyor belt after said belt has traveled a given distance to equally space articles of each support-load of articles, and to space each support-load from the succeeding support-load, and to actuate said pusher means upon presentation of a support-load of articles in registry with said article-engaging means of said pusher means.

12. Conveyor apparatus comprising a plurality of vertically spaced substantially horizontal carrier plates for supporting a full complement of aligned articles disposed in successively abutting relation during the movement of the articles from the entry end to the discharge end of a treating zone, loading and unloading mechanism for said carrier plates comprising a first endless conveyor having a vertical run thereof in confronting relation with the entry end of said treating zone operable to present a number of articles less than a full complement of articles to said treating zone at the level of each of said carrier plates, and a second endless conveyor having a vertical run thereof in confronting relation with the discharge end of said treating zone operable to receive a number of articles less than a full complement of articles from each of said carrier plates, each of said conveyors having a series of spaced supports, the spacing of said supports corresponding to that of said carrier plates, means to advance said conveyors intermittently in synchronism, article infeed conveyor means vertically spaced from said carrier plates and extending transversely thereof adjacent and in registry with a support in the vertical run of said first conveyor when supports of said vertical run are in registry with said carrier plates, pusher means operable to displace articles from said article infeed conveyor means onto a support of said first conveyor during the lull in the intermittent motion of said conveyors, pusher means operable during the lull in the intermittent motion of said conveyors to engage articles on supports in the vertical run of said first conveyor and displace them simultaneously onto said carrier plates and to advance the series of articles on each of said carrier plates in said treating zone longitudinally thereof a distance to discharge therefrom and onto supports of said vertical run of said second conveyor a like number of leading articles when a loaded support of the vertical run of said first conveyor is in registry with each of said carrier plates, article outfeed conveyor means vertically spaced from said carrier plates and extending transversely thereof adjacent and in registry with a support in the vertical run of said second conveyor when supports of said vertical run are in registry with said carrier plates, and pusher means operable to displace articles from a support of said vertical run of said second conveyor onto said article outfeed conveyor when said support is in registry therewith during the lull in the intermittent motion of said conveyors.

13. Apparatus according to claim 12 including means to advance said infeed conveyor means intermittently stepwise including actuating means responsive to presentation of an article to said infeed conveyor means, and means operable to actuate said pusher means upon presentation of a support-load of articles in registry with said pusher means.

14. Conveyor apparatus comprising a plurality of vertically spaced pairs of substantially horizontal tracks for supporting a full complement of aligned article-carrying trays disposed in successively abutting relation at a plurality of vertically spaced levels during movement of the trays from the entry end to the discharge end of a treating zone, each of said trays having roller means at each end thereof for engaging said tracks, loading mechanism for said tracks of said treating zone comprising a first pair of spaced endless conveyors each having a vertical up run in confronting relation with the entry end of said treating zone operable to present a tray loaded with untreated articles at each of said track levels of said treating zone, unloading mechanism for said tracks of said treating zone comprising a second pair of spaced endless conveyors each having a vertical down run confronting the discharge end of said treating zone operable to receive a tray from said treating zone at each of said track levels, each of said conveyors having a series of supports for engaging said roller means at the ends of said trays, the spacing between said supports of said conveyors corresponding to the vertical spacing between said pairs of tracks in said treating zone, means for advancing each of said conveyor intermittently in synchronism so that opposing supports in the vertical runs in each pair of conveyors lie in substantially the same horizontal plane and the supports of said conveyors are in registry with the tracks of said treating zone during the lull in the intermittent motion of said conveyors, pusher means operable during the lull in the intermittent motion of said conveyors for displacing a tray of untreated articles from the vertical runs of said first pair of conveyors to said treating zone at each of said track levels simultaneously and to advance the series of trays along said tracks at each of said levels in said treating zone a distance to discharge therefrom and onto supports of the vertical runs of said second pair of conveyors at each track level the leading tray of treated articles when the vertical runs of said first pair of conveyors presents a loaded tray in registry with each of said track levels of said treating zone, tray recirculation means comprising a pair of tracks for engaging said roller means of said trays spaced vertically below said plurality of track levels and extending between said vertical runs of said first and second pairs of conveyors for supporting a full complement of aligned trays disposed in successively abutting relation and having tray pusher means associated therewith operable during the lull in the intermittent motion of said conveyors for displaying a tray in registry therewith from the vertical runs of said second pair of conveyors onto said tracks and for advancing said series of trays longitudinally along said tracks a distance to discharge the leading tray therefrom and onto supports of the opposing vertical runs of the first pair of conveyors in registry therewith, article infeed conveyor means at the level of said tray recirculation means extending transversely of and adjacent the vertical runs of said second pair of conveyors, article infeed pusher means operable to displace articles from said article infeed conveyor means onto an empty tray in registry therewith at the level of said tray recirculation means during the lull in the intermittent motion of said conveyors and prior to actuation of said tray pusher means, article outfeed conveyor means located above said tray recirculation means and extending transversely of said treating zone adjacent the vertical up runs of said second pair of conveyors, and pusher means operable to displace treated articles from a tray onto said outfeed conveyor means in registry therewith during the lull in the intermittent motion of said first and second pairs of conveyors.

15. Apparatus according to claim 14 including means to advance said infeed conveyor means including means to actuate said infeed pusher means responsive to the presentation of a tray load of articles in registry with said infeed pusher means.

16. Apparatus according to claim 14 including first and second conveyor belts defining a path for delivery of articles to an empty tray in registry with said tray in registry with said tray recirculation means and supported by said vertical runs of said second pair of conveyors, said second conveyor belt adjacent to and extending transversely of said vertical runs of said second pair of conveyors at the level of said tray recirculation means, pusher means having article-engaging means extending longitudinally of said second conveyor belt, means operable to advance said second conveyor belt intermittently stepwise including actuating means therefor responsive to presentation of an article to said second conveyor belt, and means operable to actuate said pusher means upon presentation of a tray load of articles in registry with said article-engaging means of said pusher means including a first sensing means for determining when the leading article of each tray load of articles delivered by said second conveyor belt has advanced toward but within the end of said article-engaging member and a second sensing means for determining when the last article of a series of articles comprising a tray load has advanced within the other end of said article-engaging means.

17. Apparatus according to claim 14 including first and second conveyor belts defining a path for delivery of articles to an empty tray in registry with said tray recirculation means and supported by said vertical runs of said second pair of conveyors, said second conveyor belt adjacent to and extending transversely of said vertical runs of said second pair of conveyors at the level of said tray recirculation means, pusher means having article-engaging means extending longitudinally of said second conveyor belt, means operable to advance said second conveyor belt intermittently stepwise including actuating means therefor responsive to presentation of an article to said second conveyor belt and timing means for discontinuing the advancement of said second conveyor belt after said belt has traveled a given distance to equally space articles of each tray load of articles and to space each tray load from the succeeding tray load and to actuate said pusher means upon presentation of a tray load of articles in registry with said article-engaging means of said pusher means.

18. Apparatus according to claim 14 including a series of conveyor belts for delivering articles to an empty tray in registry with said tray recirculation means and comprising a continuously operable first conveyor belt for delivering substantially equally spaced articles, a continuously operable second conveyor belt in side-by-side relation to said first conveyor belt, said second conveyor belt traveling at a greater linear speed than said first conveyor belt, a continuously operable third conveyor belt, an intermittently operable fourth conveyor belt, said second, third, and fourth conveyor belts defining a continuous path for said articles, said fourth conveyor belt extending transversely of said vertical runs of said second pair of conveyors at the level of said tray recirculation means, a first pusher means operable to displace each tray load of articles presented in registry therewith from said first to said second conveyor belt, whereby a spacing is obtained between each tray load of articles displaced from said first conveyor belt onto said second conveyor belt, said third conveyor belt traveling at a linear speed less than said second conveyor belt whereby the spacing between articles and each tray load of articles is decreased, a second pusher means having article-engaging means extending longitudinally of said fourth conveyor belt operable during the lull in the intermittent motion of said conveyor to displace a tray load of articles from said fourth conveyor belt onto a tray in registry therewith, and means operable to cease movement of said fourth conveyor belt and actuate said second pusher means upon presentation of a tray load of articles in registry with said article-engaging means of said second pusher means.

19. Conveyor apparatus comprising a plurality of vertically spaced substantially horizontal carrier plates for supporting a full complement of aligned article-carrying trays disposed in successively abutting relation at a plurality of vertically spaced levels during movement of the trays from the entry end to the discharge end of a treating zone, loading and unloading mechanism for said carrier plates comprising an endless conveyor surrounding said carrier plates and having a vertical up run thereof in confronting relation with the entry end of said treating zone operable to present a tray loaded with untreated articles to said treating zone at the level of each of the said carrier plates and a vertical down run in confronting relation with the discharge end of said treating zone operable to receive a tray from each of said carrier plates, said conveyor having a series of spaced supports for said trays, the spacing betwen said supports of said conveyor corresponding to the spacing between said carrier plates, means for advancing said conveyor intermittently, pusher means operable during the lull in the intermittent motion of said conveyor to engage said trays on said supports in the up run of said conveyor and displace them simultaneously onto said carrier plates and to advance the series of trays on each of said carrier plates in said treating zone longitudinally thereof a distance to discharge therefrom and onto supports of said down run of said conveyor at the level of each carrier plates the leading tray of treated articles when the up run of said conveyor presents a tray loaded with untreated articles in registry with each of said carrier plates of said treating zone, tray recirculation means comprising a carrier plate extending between said vertical runs of said conveyor for supporting a full complement of aligned trays disposd in successively abutting relation and having tray pusher means associated therewith operable during the lull in the intermittent motion of said conveyor for displacing a tray on a support in registry therewith from th vertical down run onto said carrier plate and for advancing said series of trays along said carrier plate a distance to discharge the leading tray therefrom onto a support of the opposing vertical up run of said conveyor in registry therewith, article infeed conveyor means exterior of said conveyor, spaced apart from said vertical up run, and extending transversly of said treating zone at a level above said tray recirculation means, outfeed conveyor means extending transversely of said treating zone beneath said infeed conveyor means, a pivotally mounted shelf extending between said infeed conveyor means and said conveyor in the raised position and between said outfeed conveyor means and said conveyor in the depressed position, means to raise and lower said shelf, outfeed pusher means operable during the lull in the intermittent motion of said conveyor to displace treated articles from a tray on a support in the up run in registry therewith and onto said shelf when in its depressed position, whereby said articles are transferred to said outfed conveyor means by gravity, and infeed pusher means operable during the lull in the intermittent motion of said conveyor and subsequent to the operation of said outfeed pusher means for displacing untreated articles from said infed conveyor means onto the resulting empty tray when said shelf is in the raised position.

20. Apparatus according to claim 19 including means to advance said infeed conveyor means including means to actuate said infeed pusher means responsive to the presentation of a tray load of articles in registry with said infeed pusher means.

21. Conveyor apparatus comprising a plurality of vertically spaced substantially horizontal carrier plates for supporting a full complement of aligned article-carrying trays disposed in successively abutting relation at a plurality of vertically spaced levels during movement of the trays from the entry end to the discharge end of a treating zone, loading and unloading mechanism for said carrier plates comprising an endless conveyor surrounding said carrier plates and having a vertical up run thereof in confronting relation with the entry end of said treating zone operable to present a tray loaded with untreated articles to said treating zone at the level of each of the said carrier plates and a vertical down run in confronting relation with the discharge end of said treating zone operable to receive a tray from each of said carrier plates, said conveyor having a series of spaced supports for said trays, the spacing between said supports of said conveyor corresponding to the spacing between said carrier plates, means for advancing said conveyor intermittently, pusher means operable during the lull in the intermittent motion of said conveyor to engage said trays on said supports in the up run of said conveyor and displace them simultaneously onto said carrier plates and to advance the series of trays on each of said carrier plates in said treating zone longitudinally thereof a distance to discharge therefrom and onto supports of said down run of said conveyor at the level of each carrier plates the leading tray of treated articles when the up run of said conveyor presents a tray loaded with untreated articles in registry with each of said carrier plates of said treating zone, tray recirculation means comprising a carrier plate extending between said vertical runs of said conveyor for supporting a full complement of aligned trays disposed in successively abutting relation and having tray pusher means associated therewith operable during the lull in the intermittent motion of said conveyor for displacing a tray on a support in registry therewith from the vertical down run onto said carrier plate and for advancing said series of trays along said carrier plate a distance to discharge the leading tray therefrom onto a support of the opposing vertical up run of said conveyor in registry therewith, article infeed conveyor means extending transversely of said treating zone adjacent said vertical up run of said conveyor at a level between said plurality of vertically spaced carrier plates and said tray recirculation means, infeed pusher means operable during the lull in the intermittent motion of said conveyor for displacing untreated articles from said infeed conveyor means onto an empty tray supported by a support in said up run of said conveyor in registry therewith, article outfeed conveyor means exterior of said conveyor and extending transversely of said treating zone at a level below said infeed conveyor means, and tray tilting means for displacing treated articles from a tray onto said outfeed conveyor means.

22. Apparatus according to claim 21 including means to advance said infeed conveyor means including means to actuate said infeed pusher means responsive to the presentation of a tray load of articles in registry with said infeed pusher means.

23. Conveyor apparatus comprising a plurality of vertically spaced substantially horizontal carrier plates for supporting a full complement of aligned article-carrying trays disposed in successively abutting relation at a plurality of vertically spaced levels during movement of the trays from the entry end to the discharge end of a treating zone, loading and unloading mechanism for said carrier plates comprising an endless conveyor surrounding said carrier plates and having a vertical up run thereof in confronting relation with the entry end of said treating zone operable to present a tray loaded wtih untreated articles to said treating zone at the level of each of the said carrier plates and a vertical down run in confronting relation with the discharge end of said treating zone operable to receive a tray from each of said carrier plates, said conveyor having a series of spaced supports for said trays, the spacing between said supports of said conveyor corresponding to the spacing between said carrier plates, means for advancing said conveyor intermittently, pusher means operable during the lull in the intermittent motion of said conveyor to engage said trays on said supports in the up run of said conveyor and displace them simultaneously onto said carrier plates and to advance the series of trays on each of said carrier plates in said treating zone longitudinally thereof a distance to discharge therefrom and onto supports of said down run of said conveyor at the level of each carrier plates the leading tray of treated articles when the up run of said conveyor presents a tray loaded with untreated articles in registry with each of said carrier plates of said treating zone, tray recirculation means comprising a carrier plate extending between said vertical runs of said conveyor for supporting a full complement of aligned trays disposed in successively abutting relation and having tray pusher means associated therewith operable during the lull in the intermittent motion of said conveyor for displacing a tray on a support in registry therewith from the vertical down run onto said carrier plate and for advancing said series of trays along said carrier plate a distance to discharge the leading tray therefrom onto a support of the opposing vertical up run of said conveyor in registry therewith, article outfeed conveyor means extending transversely of said treating zone at a level between said plurality of levels of carrier plates in said treating zone and said tray recirculation means and adjacent said down run of said conveyor, having associated therewith tray tilting means for displacing treated articles from a tray in registry therewith onto said outfeed conveyor means, article infeed conveyor means extending transversely of said treating zone adjacent said down run of said conveyor at a level between said tray tilting means and said tray recirculation means, and article infeed pusher means operable during the lull in the intermittent motion of said conveyor for displacing untreated atricles from said infeed conveyor means onto an empty tray supported by a support in said down run of said conveyor in registry therewith.

24. Apparatus according to claim 23 including means to advance said infeed conveyor means including means to actuate said infeed pusher means responsive to the presentation of a tray load of articles in registry with said infeed pusher means.

25. Conveyor apparatus comprising a plurality of vertically spaced substantially horizontal shelves comprising a series of transversely extending roller means for supporting a full complement of aligned article-carrying trays disposed in successively abutting relation at a plurality of vertically spaced levels during movement of the trays from the entry end to the discharge end of a treating zone, loading and unloading mechanism for said shelves comprising an endless conveyor surrounding said shelves and having a vertical up run thereof in confronting relation with the entry end of said treating zone operable to present a tray loaded with articles to be treated to said treating zone at the level of each of said shelves and a vertical down run in confronting relation with the discharge end of said treating zone operable to receive a tray from each of said shelves, said conveyor having a series of spaced supports for said trays, the spacing between said supports corresponding to the spacing between said shelves, means for advancing said conveyor intermittently, pusher means operable during the lull in the intermittent motion of said conveyor to engage said trays on said supports in the up run of said conveyor and displace them simultaneously onto said shelves and to advance the series of trays on each of said shelves in said treating zone longitudinally thereof a distance to discharge therefrom and onto supports of said down run of said conveyor at the level of each shelf the leading tray of treated articles when the up run of said conveyor presents a loaded tray in registry with each of said shelves of said treating zone, tray recirculation means comprising a shelf comprising a series of transversely extending roller means extending between said vertical runs of said conveyor for supporting a full complement of aligned trays disposed in successively abutting relation and having pusher-puller means associated therewith operable during the lull in the intermittent motion of said conveyor for displacing treated articles from a tray on a support in registry therewith in the vertical down run of said conveyor and thereafter displacing the empty tray onto said shelf and for advancing the series of empty trays along said shelf a distance to discharge the leading empty tray therefrom onto a support of the opposing vertical up run of said conveyor in registry therewith, article infeed conveyor means extending transversely of said treating zone exterior of said conveyor adjacent said vertical up run at the level of said tray recirculation means, and infeed pusher means operable during the lull in the intermittent motion of said conveyor and subsequent to said empty tray discharge by said pusher-puller means to displace untreated articles from said infeed conveyor means onto said empty tray discharged by said pusher-puller means onto said support of said vertical up run.

26. Apparatus according to claim 25 including means to advance said infeed conveyor means including means to actuate said infeed pusher means responsive to the presentation of a tray load of articles in registry with said infeed pusher means.

27. Conveyor apparatus comprising first and second vertically spaced groups of vertically spaced pairs of substantially horizontal tracks for supporting a full complement of aligned article-carrying trays disposed in successively abutting relation at a plurality of levels, said trays having roller means at each end thereof for engaging said tracks, a first pair of spaced endless conveyors each having a vertical run in confronting relation with one end of each of said groups of tracks operable to present a tray loaded with untreated articles at each of said track levels in said first group, a second pair of spaced endless conveyors each having a vertical run confronting the opposing ends of said tracks in each of said groups operable to receive a tray from each of said track levels in said first group and to present said trays at each of said track levels in said second group, each of said conveyors having a series of supports for engaging said roller means at the ends of said trays, the spacing between said supports of said conveyors corresponding to the vertical spacing between track levels in each of said groups, means to advance said first pair of conveyors step-by-step intermittently in synchronism so that opposing supports of the vertical runs in said pair of conveyors lie in substantially the same horizontal plane and the supports of said conveyors are in registry with the tracks of said first and second groups, means for advancing said second pair of conveyors intermittently in synchronism so that opposing supports in the vertical runs thereof lie in substantially the same horizontal plane, a first pusher means operable during the lull in the intermittent motion of said conveyors for displacing a tray of untreated articles from the vertical runs of said first pair of conveyors to the tracks in said first group at each of said track levels simultaneously and to advance each of said trays along each of said tracks in said first group a distance to discharge therefrom and onto supports of the vertical runs of said second pair of conveyors at each track level the leading tray of treated articles when the vertical runs of said first pair of conveyors presents a loaded tray in registry with each of said track levels in said first group, a second pusher means operable during the lull during the intermittent motion of said conveyors for displacing a tray of treated articles from the vertical runs of said second pair of conveyors at each of said track levels in said second group simultaneously and to advance the series of trays along said tracks at each of said levels in said second group a distance to discharge therefrom onto supports of the vertical runs of said first pair of conveyors at each of said track levels in said second group the leading tray of treated articles when said vertical runs of said second pair of conveyors presents a loaded tray received from said first group in registry with each of said track levels in said second group, means for unloading treated articles from said trays received by said first pair of conveyors from said second group during the lull in the intermittent motion of said first pair of conveyors, and means for loading untreated articles onto an empty tray supported by said first pair of conveyors during the lull in the intermittent motion of said first pair of conveyors.

28. Conveyor apparatus comprising a plurality of vertically spaced pairs of substantially horizontal tracks for supporting a full complement of aligned article-carrying trays diposed in successively abutting relation at a plurality of vertically spaced levels during movement of the trays from the entry end to the discharge end of a treating zone, the ends of each of said trays engaging said tracks, loading mechanism for said tracks of said treating zone comprising a first pair of spaced endless conveyors each having a vertical run in confronting relation with the entry end of said treating zone operable to present a tray loaded with untreated articles at each of said track levels of said treating zone, unloading mechanism for said tracks of said treating zone comprising a second pair of spaced endless conveyors each having a vertical run confronting the discharge end of said treating zone operable to receive a tray from said treating zone at each of said track levels, each of said conveyors having a series of supports for engaging the ends of said trays, the spacing between said supports of said conveyors corresponding to the vertical spacing between said pairs of tracks in said treating zone, means for advancing each of said conveyors intermittently in synchronism so that opposing supports in the vertical runs in each pair of conveyors lie in substantially the same horizontal plane and the supports of said conveyors are in registry with the tracks of said treating zone during the lull in the intermittent motion of said conveyors, pusher means operable during the lull in the intermittent motion of said conveyors for displacing a tray of untreated articles from the vertical run of said first pair of conveyors to said treating zone at each of said track levels simultaneously and to advance the series of trays along said tracks at each of said levels in said treating zone a distance to discharge therefrom and onto supports of the vertical runs of each second pair of conveyors at each of said track levels the leading tray of treated articles when the vertical runs of said first pair of conveyors presents a loaded tray in registry with each of said track levels of said treating zone, tray recirculation means comprising a pair of tracks for engaging the ends of said trays spaced vertically from said plurality of track levels and extending between said vertical runs of said first and second pair of conveyors for supporting a full complement of aligned trays disposed in successively abutting relation and having tray pusher means associated therewith operable during the lull in the intermittent motion of said conveyors for displacing a tray in registry therewith from the vertical run of said second pair of conveyors onto said tracks and for advancing said series of trays longitudinally along said tracks a distance to discharge the leading tray therefrom and onto supports of the opposing vertical run of said first pair of conveyors in registry therewith, article infeed conveyor means extending transversely of said treating zone adjacent to one of the vertical runs of said pairs of conveyors and article infeed pusher means operable to discharge articles from said article infeed conveyor means onto an empty tray on said vertical run and in registry therewith during the lull in the intermittent motion of said conveyors, article outfeed conveyor means extending transversely of said treating zone adjacent to one of said vertical runs of said pairs of conveyors and pusher means operable to displace treated articles from a tray on said vertical run onto said outfeed conveyor means in registry therewith during the lull in the intermittent motion of said first and second pairs of conveyors.

29. Article conveyor means for disposing conveyed spaced articles into closer-spaced groups comprising a continuously operable first conveyor belt for delivering substantially equally spaced articles, a continuously operable second conveyor belt in side-by-side relation to said first conveyor belt, said second conveyor belt traveling at a greater linear speed than said first conveyor belt, a continuously operable third conveyor belt, an intermittently operable fourth conveyor belt, said second, third and fourth conveyor belts defining a continuous path for said articles, a first pusher means operable to displace a group of articles presented in registry therewith from said first to said second conveyor belt, whereby a spacing is obtained between each group of articles displaced from said first conveyor belt onto said second conveyor belt, said third conveyor belt traveling at a linear speed less than said second conveyor belt whereby the spacing between articles and each group of articles transferred from said second conveyor to said third conveyor is decreased, a second pusher means having article-engaging means extending longitudinally of said fourth conveyor belt operable to displace a group of articles from said fourth conveyor belt, and means operable to cease movement of said fourth conveyor belt and actuate said second pusher means upon presentation of a group of articles in registry with said article-engaging means of said second pusher means.

References Cited in the file of this patent

UNITED STATES PATENTS

| | | |
|---|---|---|
| 1,123,934 | Schrafft et al. | Jan. 5, 1915 |
| 1,452,711 | Schroeder | Apr. 24, 1923 |
| 1,577,589 | Rapp | Mar. 23, 1926 |
| 1,869,210 | Moore | July 26, 1932 |
| 2,583,847 | Hummel | Jan. 29, 1952 |
| 2,734,617 | Temple | Feb. 14, 1956 |

UNITED STATES PATENT OFFICE

CERTIFICATE OF CORRECTION

Patent No. 3,068,987                        December 18, 1962

John J. Franklin

It is hereby certified that error appears in the above numbered patent requiring correction and that the said Letters Patent should read as corrected below.

Column 2, line 72, for "the" read -- a --; column 3, line 48, for "is" read -- in --; column 8, line 41, for "sufaces" read -- surfaces --; column 10, line 4, for "article" read -- articles --; column 13, line 74, for "general" read -- generally --; column 18, line 20, for "as" read -- at --; column 25, line 18, for "th" read -- the --; line 41, for "infed" read -- infeed --.

Signed and sealed this 6th day of August 1963.

(SEAL)
Attest:

ERNEST W. SWIDER                        DAVID L. LADD
Attesting Officer                           Commissioner of Patents